(12) United States Patent
Miyata et al.

(10) Patent No.: US 7,389,054 B2
(45) Date of Patent: Jun. 17, 2008

(54) OPTICAL COMMUNICATION APPARATUS AND OPTICAL ADD/DROP APPARATUS

(75) Inventors: Hideyuki Miyata, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/464,650

(22) Filed: Jun. 19, 2003

(65) Prior Publication Data

US 2003/0210915 A1 Nov. 13, 2003

Related U.S. Application Data

(62) Division of application No. 09/495,715, filed on Feb. 1, 2000, now Pat. No. 7,006,771.

(30) Foreign Application Priority Data

Feb. 19, 1999 (JP) .................................. 11-41177

(51) Int. Cl.
*H04B 10/04* (2006.01)
(52) U.S. Cl. ........................................ 398/198; 398/201
(58) Field of Classification Search ......... 398/195–198, 398/201
See application file for complete search history.

(56) References Cited

U.S. PATENT DOCUMENTS

| | | | |
|---|---|---|---|
| 4,198,675 A | 4/1980 | Moore | 364/525 |
| 5,489,771 A | 2/1996 | Beach et al. | 250/205 |
| 5,515,166 A | 5/1996 | Mori et al. | 356/345 |
| 5,555,326 A | 9/1996 | Hwang et al. | 385/2 |
| 5,687,018 A | 11/1997 | Funaki | 359/245 |
| 5,900,621 A | 5/1999 | Nagakubo et al. | 250/205 |
| 6,134,034 A | 10/2000 | Terahara | 359/124 |
| 6,243,175 B1 * | 6/2001 | Pelekhaty | 398/9 |
| 6,268,945 B1 | 7/2001 | Roberts | 359/161 |
| 6,278,536 B1 * | 8/2001 | Kai et al. | 398/79 |
| 7,006,771 B1 * | 2/2006 | Miyata et al. | 398/198 |

FOREIGN PATENT DOCUMENTS

| | | |
|---|---|---|
| EP | 0481242 A2 | 4/1992 |
| EP | 0725299 A2 | 8/1996 |
| EP | 0792033 A2 | 8/1997 |
| JP | 56-121013 | 9/1981 |
| JP | 57004625 A | 1/1982 |

(Continued)

OTHER PUBLICATIONS

Patent Abstracts of Japan of Japanese Patent Application Laid-open Publication No. Hei 9-61768, May 7, 1997.

(Continued)

*Primary Examiner*—Leslie Pascal
(74) *Attorney, Agent, or Firm*—Staas & Halsey LLP

(57) ABSTRACT

The present invention relates to an optical communication apparatus for detecting the intensity of light in an optical modulator or the intensity of a modulation signal and for controlling the operating point of the optical modulator based on the result of detection. In the optical communication apparatus having such a configuration, the operating point of the optical modulator can be kept stable even when the input light or the modulation signal is temporarily non-existent in the optical communication apparatus.

10 Claims, 22 Drawing Sheets

FOREIGN PATENT DOCUMENTS

| | | |
|---|---|---|
| JP | 4-294318 | 10/1992 |
| JP | 5-297331 | 11/1993 |
| JP | 8-76071 | 3/1996 |
| JP | 9-236781 | 9/1997 |
| JP | 10-123471 | 5/1998 |
| WO | WO99/04311 | 1/1999 |

OTHER PUBLICATIONS

Patent Abstracts of Japan, Publication No. 09266341, published Oct. 7, 1997.

Patent Abstracts of Japan, Publication No. 07058698, published Mar. 3, 1995.

Notice of Reasons for Rejection mailed Jul. 6, 2006 in Japanese Patent Application Hei 11-41177.

Decision of Rejection mailed Oct. 18, 2006 in Japanese Patent Application Hei 11-41177.

* cited by examiner

OPTICAL COMMUNICATION APPARATUS AND OPTICAL ADD/DROP APPARATUS

This application is a divisional of U.S. patent application Ser. No. 09/495715, filed Feb. 1, 2000, now U.S. Pat. No. 7,006,771.

BACKGROUND OF THE INVENTION

1. Field of the Invention

The present invention, an optical communication apparatus which transmits wavelength-division multiplexed signal light, relates to an optical communication apparatus whose operation is stabilized irrespective of presence/absence of input light or a modulated signal to be transmitted, as well as to an optical add/drop apparatus using such an optical communication apparatus as an addition apparatus.

2. Description of the Related Art

Ultra-long-distance and large-capacity optical communication apparatuses are now required to construct future multimedia networks. Concentrated studies are now being made of the wavelength-division multiplexing as a method for realizing large-capacity apparatuses in view of such advantages that it can effectively utilize a wide bandwidth and a large capacity of an optical fiber.

In particular, studies are in progress about an optical add/drop apparatuses of the wavelength-division multiplexing method and optical modulators used in the addition section of such an optical add/drop apparatus that is required in each node of the lightwave network.

In the Mach-Zehnder interferometer type optical modulators (hereinafter abbreviated as "MZ modulator") that are used as optical modulators in conventional optical communication apparatuses, it is necessary to stabilize the output optical signal with respect to a variation and the variation with temperature and time. Japanese Patent Laid-Open No. 251815/1991 discloses an operating point control circuit for controlling the operating point of an MZ modulator intended for this purpose.

FIG. 20 is a block diagram of an MZ modulator having this conventional operating point control circuit.

As shown in FIG. 20, light exit from a light source 310 such as a laser diode (hereinafter abbreviated as "LD") is entered to an MZ modulator 311. A modulation signal including information to be sent and a low-frequency signal of a predetermined frequency f0 that is outputted from a low-frequency oscillator 324 are inputted to a variable gain amplifier 313. The variable gain amplifier 313 superimposes the low-frequency signal of the predetermined frequency f0 on the modulation signal and outputs it, which is then inputted to one modulation-input terminal of the MZ modulator 311 via an amplifier 314 for obtaining a predetermined signal level and a coupling capacitor 315. A bias T circuit consisting of an inductor 316 and a capacitor 317 is connected to the other modulation-input terminal of the MZ modulator 311. The capacitor 317 is grounded via resistor 318. A portion consisting of the amplifier 314, the coupling capacitor 315, the bias T circuit, and the resistor 318 are equivalent to a drive circuit of the MZ modulator 311.

The MZ modulator 311 modulates light that is supplied from the light source 310 with a signal that is given by the drive circuit and outputs a resulting signal.

Part of an optical output of the MZ modulator 311 is branched and taken out by an optical coupler 312. The branched part of the optical output is detected by a photoelectric converter 319 such as a photodiode (hereinafter abbreviated as "PD"), and the detection signal is amplified by a buffer amplifier 320 that selectively amplifies a frequency component of f0 and inputted to a multiplier 321. The low-frequency signal that is outputted from the low-frequency oscillator 324 is also inputted to the multiplier 321. The multiplier 321 compares the phases of the signal that is inputted from the buffer amplifier 320 and the low-frequency signal that is inputted from the low-frequency oscillator 324, and outputs a signal in accordance with a phase difference.

Therefore, the multiplier 321 can detect the low-frequency signal of the predetermined frequency f0 that was superimposed by the variable gain amplifier 313.

An output signal of the multiplier 321 is inputted to one input terminal of a differential amplifier 323 via a low-pass filter (hereinafter abbreviated as "LPF") 322 that allows passage of a frequency component of the predetermined frequency f0 or less. On the other hand, the other input terminal of the differential amplifier 323 is grounded. An output of the differential amplifier 323 is inputted to the inductor 316 of the bias T circuit as an error signal to be used for moving the operating point of the MZ modulator 311, whereby the bias value is variably controlled so as to correct the operating point.

In the MZ modulator having the above configuration, the superimposed low-frequency signal of the frequency f0 does not appear in the output light when the bias value is in the optimum state.

FIG. 21 is a waveform diagram showing an operation in a state that the operating point drifts in the MZ modulator having the above circuit configuration. Part (a) of FIG. 21 shows input/output characteristics of the MZ modulator, in which curve B represents an input/output characteristic in a case where the operating point has drifted to the high-voltage side from that of curve A and curve C represents a case where the operating point has drifted to the low-voltage side from that of curve A. Part (b) of FIG. 21 shows a waveform of an input signal and parts (c), (c1), and (c2) of FIG. 21 show waveforms of output optical signals of the respective input/output characteristics.

As shown in FIG. 21, when the operating point has drifted to the high-voltage side or the low-voltage side, low-frequency signal of the frequency f0 superimposed in output light appears with a phase that is inverted by 180° depending on the drift direction. Therefore, the bias voltage can be controlled by using a signal coming from the multiplier 321, whereby the drift of the operating point can be compensated for.

In this manner, a drift of the operating point can be compensated for by taking out a low-frequency signal from output light that has been produced by modulating input light with a modulation signal and the low-frequency signal and then comparing its phase with the phase of the original low-frequency signal. Therefore, the operating point control circuit described above can control the operating point to stabilize it in a case where input light (output light) and a modulation signal exist.

FIG. 22 is a block diagram showing a conventional optical add/drop apparatus.

As shown in FIG. 22, after wavelength-division multiplexed signal light transmitting through an optical transmission line is amplified to a predetermined light intensity, it is then entered to an OADM (optical add-drop multiplexer) node section 350 which adds/drops on the wavelength-division multiplexed signal light. Signal light beams of predetermined wavelengths are dropped by the OADM node section 350 and subjected to receiving operations in optical dropping sections 352 that are provided in the same number of signal light beams to be branched by an optical coupler 351. Signal light beams to be added by the OADM node section 350 is generated by optical addition sections 355. The optical addition sections 355 are provided in the same number of signal light beams of respective wavelengths to be added by the OADM node section 350. The added signal light beams and the signal light that has not been dropped in the OADM node section 350 are wavelength-division multiplexed, amplified, and then outputted to the optical transmission line.

In each optical addition section 355 of this optical add/drop apparatus, light that is exit from an LD 360 for generating light of a particular wavelength is amplified by an optical amplifier 361. Output light of the optical amplifier 361 is modulated by an optical modulator 362 having the above-described operating point control circuit. The modulated optical signal is amplified by an optical amplifier 363 and then entered to an optical coupler 354. The optical coupler 354 adds this optical signal to the OADM node section 350 together with optical signals of other wavelengths that have been generated by other optical addition sections 355 having the same configuration.

Incidentally, in the MZ modulator 311 shown in FIG. 20, the following problem occurs when there is a short break in which the input light entered to the MZ modulator 311 is temporarily non-existent and then recovers.

When the input light no longer exists, there is no light output to be branched by the optical coupler 312 and hence the operating point becomes indefinite. That is, in part (b) of FIG. 21, it is impossible to judge whether the bias voltage Vb is (1) 0 V or less, (2) greater than 0 V and smaller than Vp, or (3) Vp or more.

If the input light recovers in such an indefinite state, in case (2) the optimum operating point is established by the operation of the bias T circuit. However, the optimum operating point is not established in cases (1) and (3); Vb is predetermined at 0 V in case (1) and Vb is predetermined at Vp in case (3).

By these reasons, when a short break occurs in the input light that is incident on the MZ modulator 311, the optimum operating point is not necessarily obtained.

Hitherto, the above problem did not occur because the MZ modulator 311 was used in terminal stations or the like where no short breaks occur on the input light. However, where the MZ modulator 311 is used in each optical addition section 355 of the optical add/drop apparatus of FIG. 22, it is necessary to switch the wavelength of addition light to a wavelength that is not used in a wavelength-division multiplexed signal transmitting through the optical transmission line. This necessarily causes, during such wavelength switching, a state where no input light exists. Therefore, the solving the problem of being in the above indefinite state is a particularly important issue.

On the other hand, in the optical add/drop apparatus of FIG. 22, when there is no input light to the optical modulator 362, ASE (amplified spontaneous emission), which is a noise level spontaneously generated by the optical amplifiers 361 and 363, is outputted to the optical transmission line. Further, each optical addition section 355 does not always have a modulation signal to be added. When no such modulation signal exists, not only ASE but also input light that is not modulated with any modulation signals are outputted to the optical transmission line.

Further, in optical communication networks, the judgement of malfunctions occurring therein is based on the light intensity. Therefore, the malfunction cannot be judged if ASE or input light that is not modulated with a modulation signal is inputted to an optical transmission line.

SUMMARY OF THE INVENTION

The first object of the present invention is to provide an optical communication apparatus for keeping the operating point of an optical modulator stable even when the input light or the modulation signal is temporarily non-existent in the optical communication apparatus.

The object is attained by the optical communication apparatus for detecting the light intensity of light in an optical modulator or the intensity of a modulation signal and for controlling the operating point of the optical modulator based on the result of detection.

The second object of the present invention is to provide an optical communication apparatus which does not exit ASE nor input light that is not modulated with an modulation signal even when the input light or the modulation signal is temporarily non-existent in the optical communication apparatus.

The object is attained by the optical communication apparatus for detecting the intensity of light in an optical modulator or the intensity of a modulation signal and for regulating the intensity of light transmitted to an optical transmission line from the optical modulator based on the result of detection.

The regulation of the light intensity is regulated, for example, by an optical attenuator for attenuating the intensity of light entered to the optical modulator or by an optical attenuator for attenuating the intensity of light exit from the optical modulator. As another example, switching the optical modulator regulates the regulation of the light intensity.

As one of aspects of the present invention, the optical communication apparatus can be used in an optical add/drop apparatus for adding and dropping an optical signal to and from wavelength-division multiplexed optical signal.

As another aspect of the present invention, the optical add/drop apparatus, even when there are any unused communication apparatuses, since the input light or the output of the optical modulator of an unused addition apparatus and the modulation signal are monitored, the operating point of the optical modulator is kept stable and neither ASE nor input light that is not modulated with a modulation signal is exit from such an addition apparatus.

Besides, another objects and characteristics of the present invention will be described specifically as follows referring to the accompanying drawings.

DESCRIPTION OF THE PREFERRED EMBODIMENTS

Figure 1:
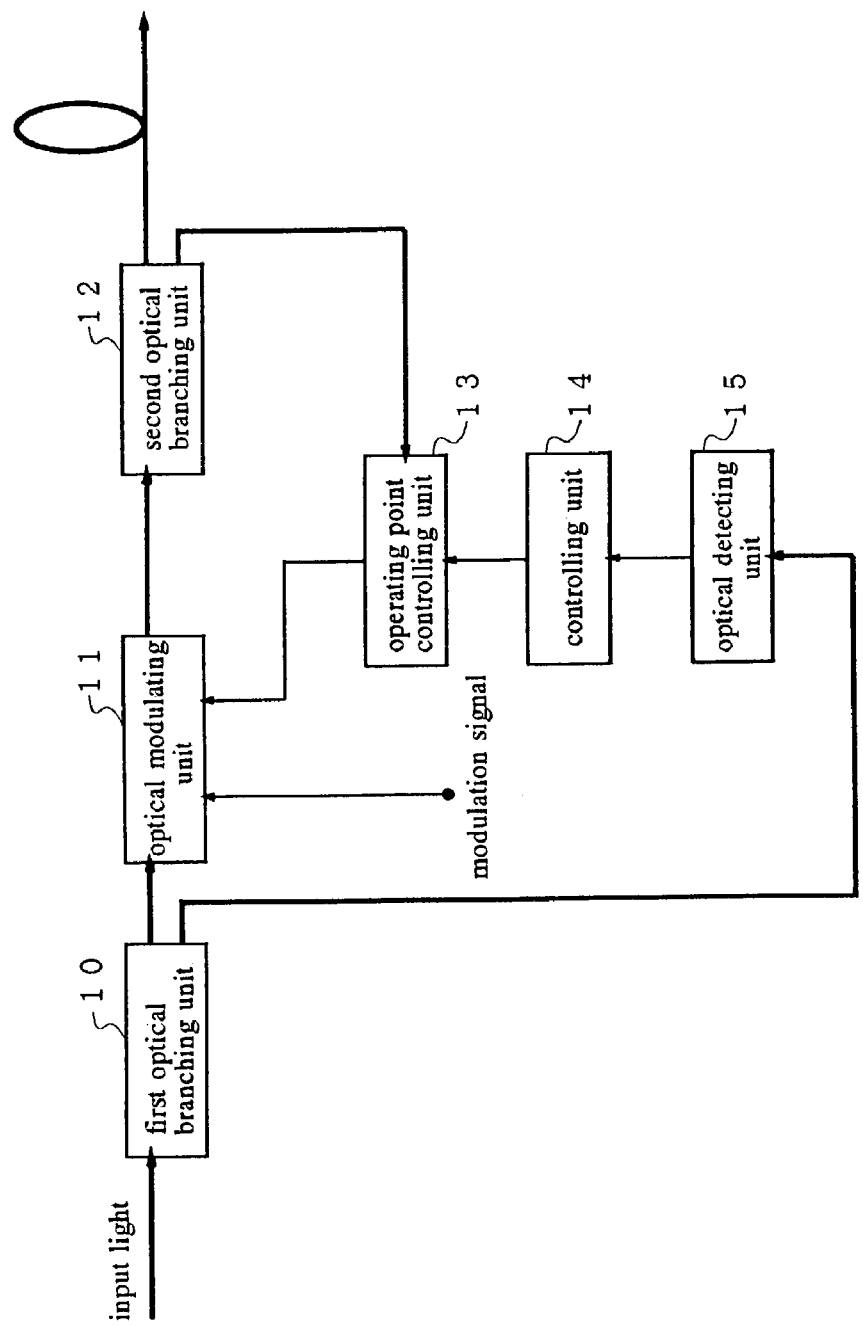
FIG. 1 is a block diagram of the optical communication apparatus according to the first embodiment.

The embodiment of optical communication apparatuses according to the invention will be hereinafter described with reference to the accompanying drawings. Besides, the same reference numerals of each figure indicate that they have the same constructions and description thereof will be omitted in the following.

The optical communication apparatus according to the first embodiment will be explained based on the accompanying figure.

In FIG. 1, this optical communication apparatus is composed of optical branching unit 10 and 12, an optical modulating unit 11, an operating point controlling unit 13, a controlling unit 14, and an optical detecting unit 15.

Light entered to an input port is branched by the optical branching unit 10 that branches light into two. The first branched input light that has been branched off by the optical branching unit 10 is modulated by the optical modulating unit 11 in accordance with a modulation signal to be transmitted. A modulated optical signal that is outputted from the optical modulating unit 11 is branched by the optical branching unit 12 that branches light into two.

The first optical signal branched off by the optical branching unit 12 is exit to an output port. On the other hand, the second optical signal branched off by the optical branching unit 12 is entered to the operating point controlling unit 13 that controls the operating point of the optical modulating unit 11 is entered.

The operating point controlling unit 13 can keep the operating point of the optical modulating unit 11 in the optimum state when receiving a part of the optical signal that is exit from the optical modulating unit 11.

On the other hand, the optical detecting unit 15 detects the intensity of the second branched input light that has been branched off by the optical branching unit 10, and outputs a signal in accordance with the detected light intensity. For example, the optical detecting unit 15 outputs a signal when the light intensity is a predetermined value or less. Alternatively, the optical detecting unit 15 outputs a signal when the light intensity is zero. So that the operating point controlling unit 13 can keep the operating point stable, the signal that is generated in accordance with the light intensity is inputted to the controlling unit 14 that controls the operation of the operating point controlling unit 13.

When receiving a signal from the optical detecting unit 15, the controlling unit 14 controls stopping the operation of the operating point controlling unit 13. Alternatively, the controlling unit 14 controls the operating point controlling unit 13 so that it keeps the operating point in a limited range.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it can keep the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value based only on the output of the optical modulating unit 11 that is entered via the optical branching unit 12.

Next, the optical communication apparatus according to the second embodiment will be explained based on the accompanying figure.

Figure 2:
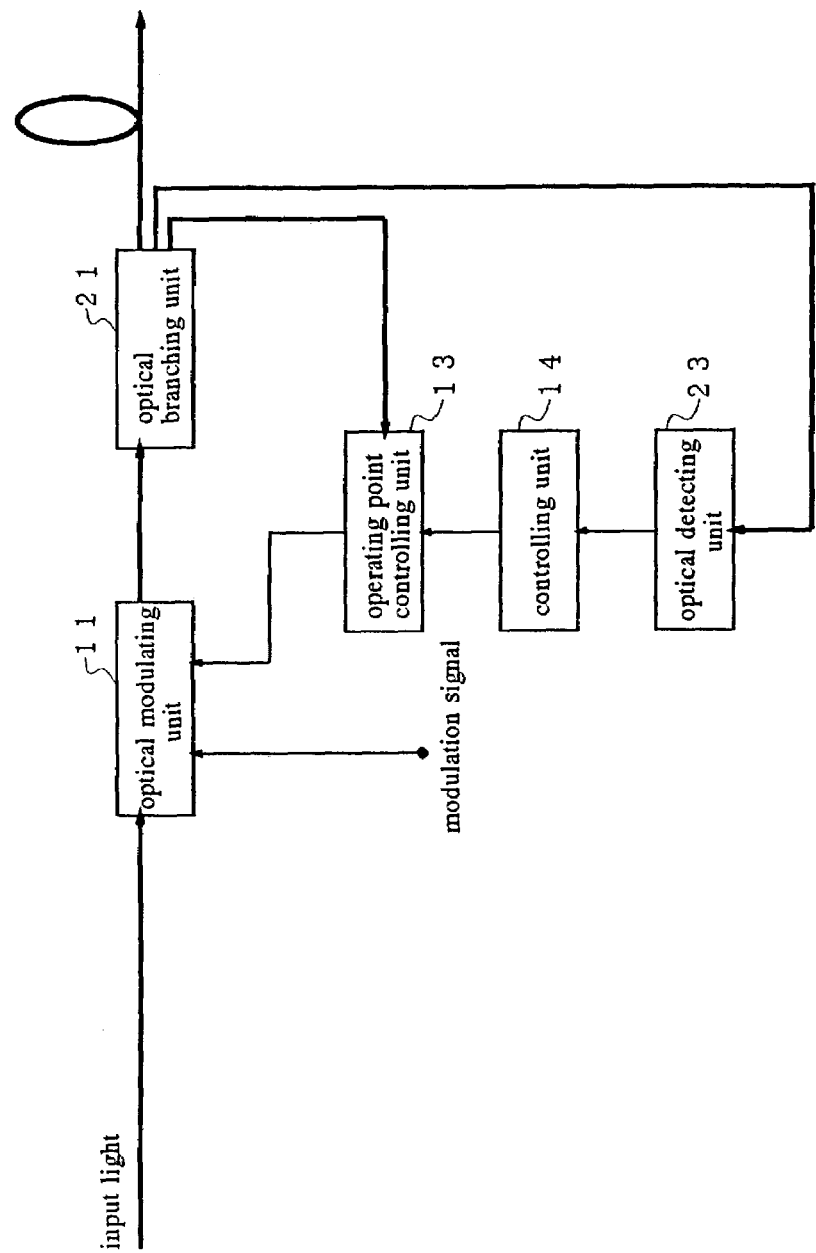
FIG. 2 is a block diagram of the optical communication apparatus according to the second embodiment.

As shown in FIG. 2, the optical communication apparatus is composed of an optical modulating unit 11, an optical branching unit 21, an operating point controlling unit 13, a controlling unit 14, and an optical detecting unit 23.

Light entered to an input port is modulated by the optical modulating unit 11. The modulated optical signal is branched by the optical branching unit 21 that branches light into three.

The first optical signal that has been branched off by the optical branching unit 21 is exit to an output port. On the other hand, the second optical signal that has been branched off by the optical branching unit 21 is entered to the operating point controlling unit 13.

On the other hand, the optical detecting unit 23 detects the light intensity of the third optical signal branched off by the optical branching unit 21, and outputs a signal in accordance with the detected light intensity. For example, the optical detecting unit 23 outputs a signal when the light intensity of the modulated optical signal is a predetermined value or less. Alternatively, the optical detecting unit 23 outputs a signal when the light intensity is zero. The signal that is generated in accordance with the light intensity is inputted to the controlling unit 14.

When the intensity of input light is a predetermined value or less, the intensity of a modulated optical signal that is exit from the optical modulating unit 11 is also a predetermined value or less. Because of this, whether the intensity of the input light is the predetermined value or less can be detected by detecting the light intensity of the modulated optical signal with the optical detecting unit 23. Therefore, the controlling unit 14 can control, in accordance with the output of the optical detecting unit 23, the operating point controlling unit 13 so that it can keep the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value only based on the output of the optical modulating unit 11 that is entered via the optical branching unit 21.

Next, the optical communication apparatus according to the third embodiment will be explained based on the accompanying figure.

Figure 3:
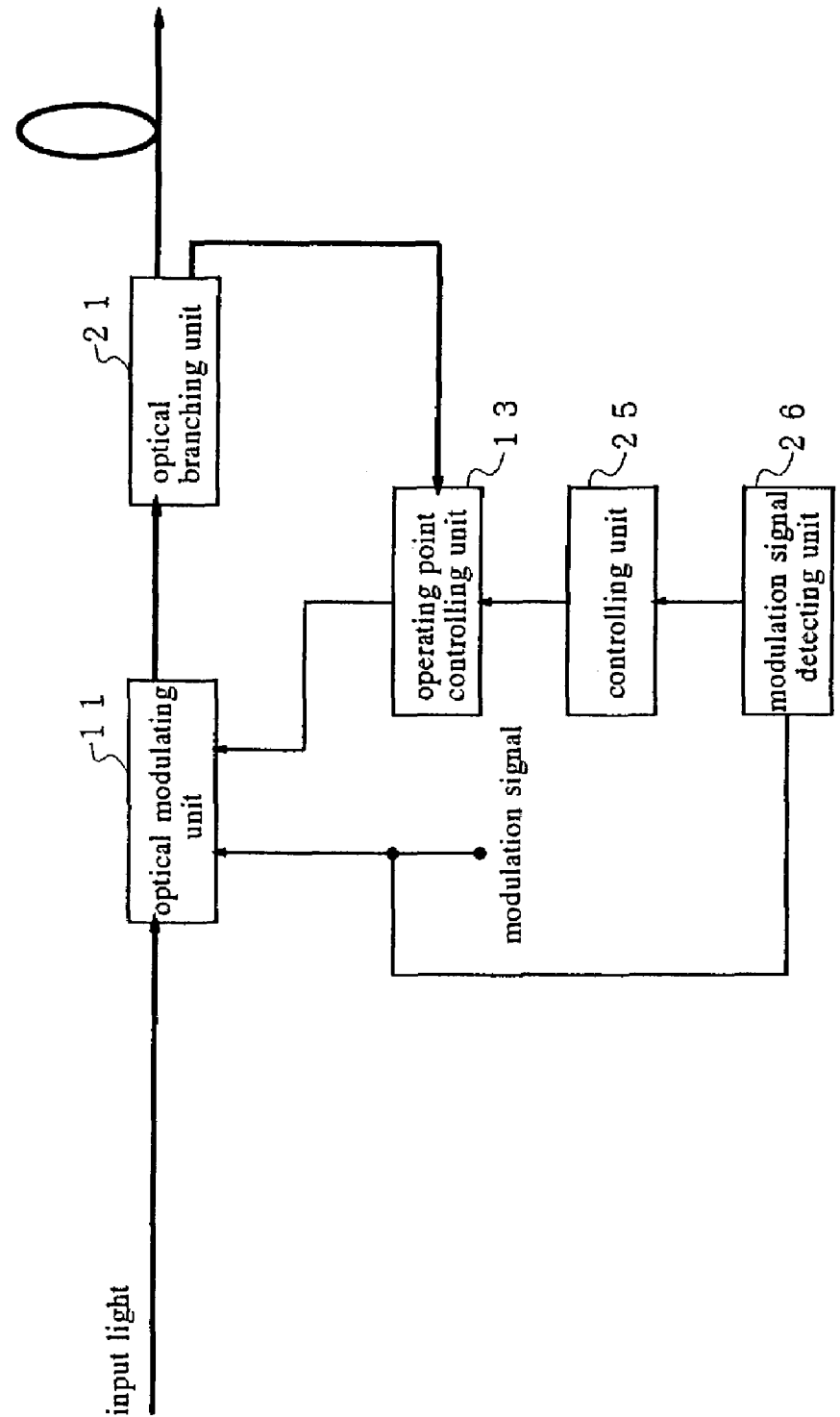
FIG. 3 is a block diagram of the optical communication apparatus according to the third embodiment.

As shown in FIG. 3, the optical communication apparatus is composed of an optical modulating unit 11, an optical branching unit 12, an operating point controlling unit 13, a controlling unit 25, and a modulation signal detecting unit 26.

Light entered to an input port is modulated by the optical modulating unit 11. A modulated optical signal is branched by the optical branching unit 12.

The first optical signal branched off by the optical branching unit 12 is exit to an output port. On the other hand, the second optical signal branched off by the optical branching unit 12 is entered to the operating point controlling unit 13.

A modulation signal to be transmitted is inputted to not only the optical modulating unit 11 but also the modulation signal detecting unit 26. The modulation signal detecting unit 26 detects the intensity of the modulation signal and outputs a signal in accordance with the detected signal intensity. For example, the modulation signal detecting unit 26 outputs a signal when the signal intensity becomes a predetermined value or less. Alternatively, the modulation signal detecting unit 26 outputs a signal when the signal intensity becomes zero. The signal that is generated in accordance with the signal intensity is inputted to the controlling unit 25.

When receiving a signal from the modulation signal detecting unit 26, the controlling unit 25 stops the operation of the operating point controlling unit 13. Alternatively, the controlling unit 25 controls the operating point controlling unit 13 so that it keeps the operating point in a limited range.

In this manner, the modulation signal detecting unit 26 can detect whether the intensity of a modulation signal is a predetermined value or less. Therefore, when the intensity of the modulation signal is the predetermined value or less, the controlling unit 25 can control, in accordance with the output of the modulation signal detecting unit 26, the operating point controlling unit 13 so that it keeps the operating point stable. As a result, in the optical communication apparatus having the above configuration, the operating point can be kept stable even when modulation signal is temporarily non-existent.

Naturally, the modulation signal detecting unit 26 does not output any signals when there is information to send and the intensity of a modulation signal to be transmitted is larger than the predetermined value. Therefore, the operating point controlling unit 13 controls the operating point to the optimum value only based on the output of the optical modulating unit 11 that is entered via the optical branching unit 12.

Next, the optical communication apparatus according to the fourth embodiment will be explained based on the accompanying figure.

Figure 4:
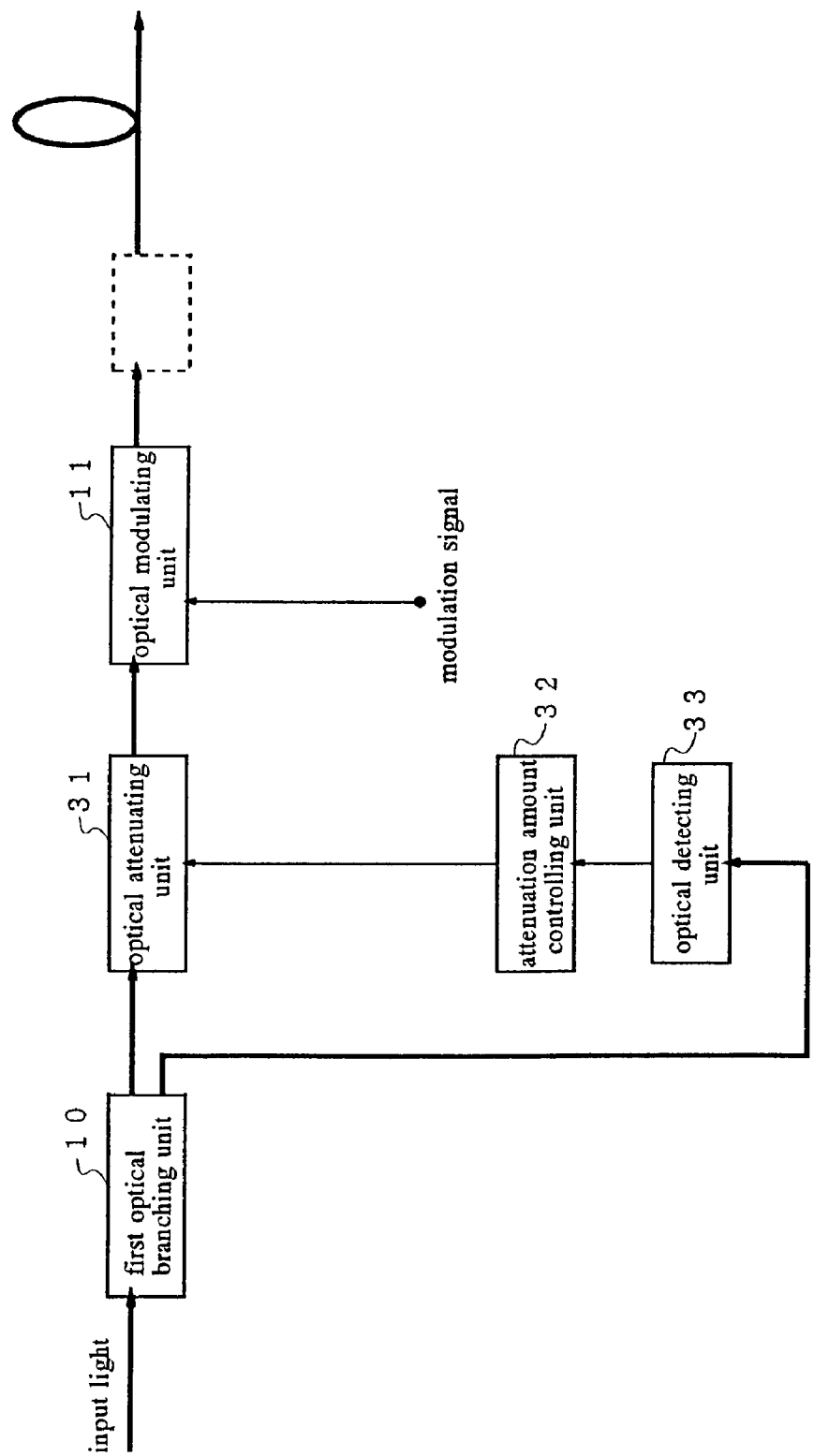
FIG. 4 is a block diagram of the optical communication apparatus according to the fourth embodiment.

In FIG. 4, this optical communication apparatus is composed of an optical branching unit 10, an optical modulating unit 11, an optical attenuating unit 31, an attenuation amount controlling unit 32, and an optical detecting unit 33.

FIG. 4 shows a configuration in which first branched input light that is exit from the optical branching unit 10 is exit to an output port via the optical attenuating unit 31 and the optical modulating unit 11.

On the other hand, as shown with broken lines in the same figure, the optical communication apparatus can be configured as the output light is exit to an output port via the optical modulating unit 11 and the optical attenuating unit 13.

Light entered to an input port is branched by the optical branching unit 10. The first branched input light that has been branched off by the optical branching unit 10 is entered, via the optical attenuating unit 31, to the optical modulating unit 11, where it is modulated. A modulated optical signal that is exit from the optical modulating unit 11 is exit to the output port.

The optical attenuating unit 31 trajects or attenuates it to predetermined light intensity (including zero). Alternatively, the optical attenuating unit 31 is a single input/plural output optical switch. When the optical attenuating unit 31 is such an optical switch, one output terminal is connected to the optical modulating unit 11 and the other output terminal(s) are not connected to anything.

On the other hand, the optical detecting unit 33 detects the intensity of the second branched input light that has been branched off by the optical branching unit 10, and outputs a signal in accordance with the detected light intensity. For example, the optical detecting unit 33 outputs a signal when the light intensity is a predetermined value or less. Or, the optical detecting unit 33 outputs a signal when the light intensity is zero. The signal that is generated in accordance with the light intensity is inputted to the attenuation amount controlling unit 32.

The attenuation amount controlling unit 32 controls the optical attenuating unit 31. That is, in accordance with a signal that is outputted from the optical detecting unit 33, the attenuation amount controlling unit 32 controls the optical attenuating unit 31 so that it attenuates the input light to the predetermined intensity. Alternatively, where the optical attenuating unit 31 is an optical switch, in accordance with a signal that is outputted from the optical detecting unit 33, the attenuation amount controlling unit 32 switches the output of inputted light to an output terminal to which nothing is connected.

In this manner, the optical detecting unit 33 can detect whether the intensity of input light is a predetermined value or less. Therefore, when the intensity of the input light is the predetermined value or less, the attenuation amount controlling unit 32 can output inputted light to the optical modulating unit 11 attenuating it to predetermined light intensity by controlling the optical attenuating unit 31 in accordance with the output of the optical detecting unit 33. Alternatively, the attenuation amount controlling unit 32 can output the input light to a terminal that is not connected to the optical modulating unit 11. As a result, in the optical communication apparatus having the above configuration, ASE is not exit to the output port when no input light exists.

Naturally, the optical detecting unit 33 does not output any signals when the intensity of input light is larger than the predetermined value so as to use the optical modulating unit 11. At this time, the attenuation amount controlling unit 32 controls the optical attenuating unit 31 so as to traject the input light or switch to the terminal that is connected to the optical modulating unit 11.

Next, the optical communication apparatus according to the fifth embodiment will be explained based on the accompanying figure.

Figure 5:
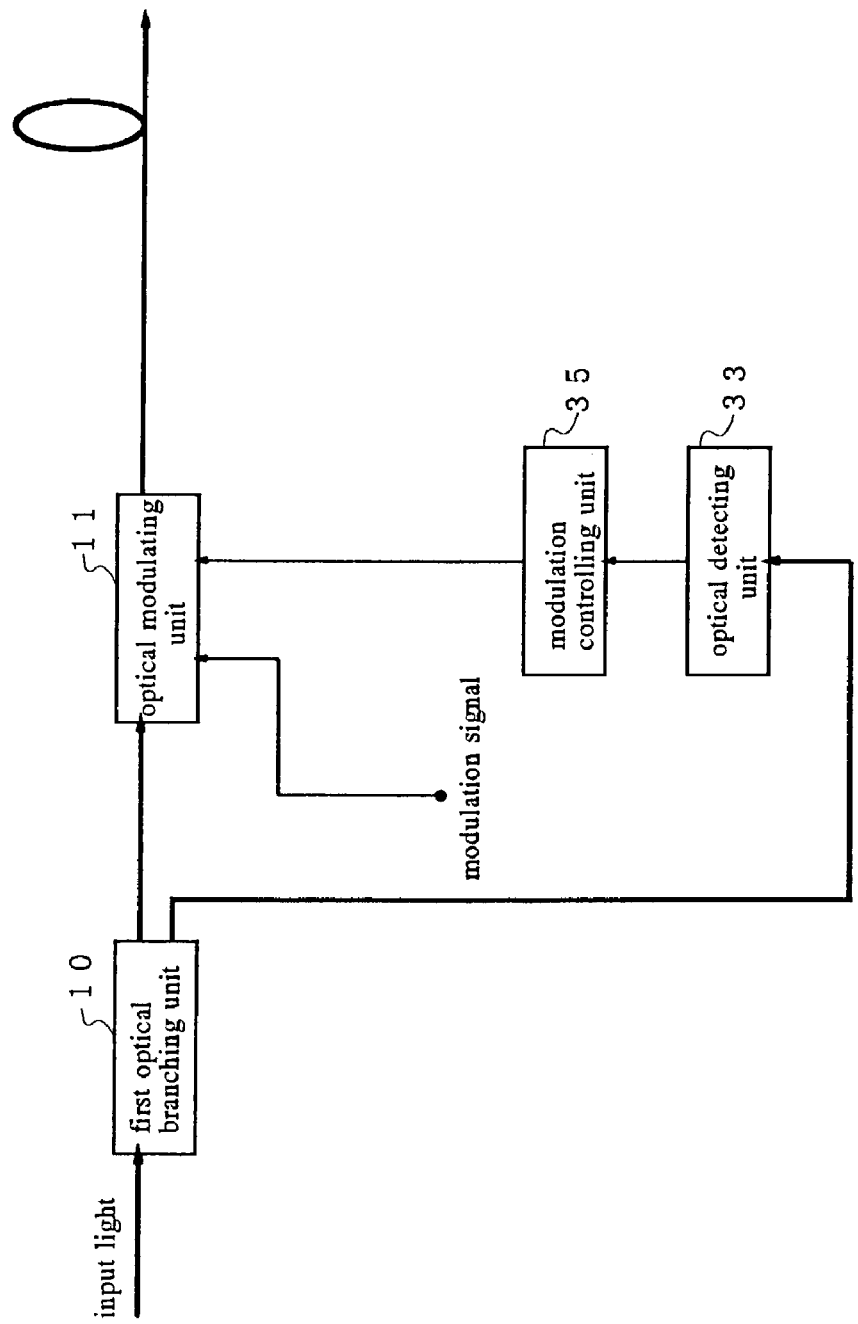
FIG. 5 is a block diagram of the optical communication apparatus according to the fifth embodiment.

In FIG. 5, this optical communication apparatus is composed of an optical branching unit 10, an optical modulating unit 11, an optical detecting unit 33, and a modulation controlling unit 35.

Light entered to an input port is branched by the optical branching unit 10. The first branched input light that has been branched off by the optical branching unit 10 is modulated by the optical modulating unit 11, and the modulated optical signal is exit to an output port.

On the other hand, the optical detecting unit 33 detects the intensity of the second branched input light that has been branched off by the optical branching unit 10, and outputs a signal in accordance with the detected light intensity. The signal that is generated in accordance with the light intensity is inputted to the modulation controlling unit 35.

The modulation controlling unit 35 controls the optical modulating unit 11. That is, in accordance with the signal that is outputted from the optical detecting unit 33, the modulation controlling unit 35 controls the optical modulating unit 11 so that it attenuates the input light to the predetermined intensity. For example, the modulation controlling unit 35 can prevent the optical modulating unit 11 from producing any output by not supplying any energy to the optical modulating unit 11. Alternatively, where the optical modulating unit 11 is an MZ modulator, this can be done by shifting the phases of branched input light beams transmitting through two respective optical waveguides in the MZ modulator by forming a phase difference of 180°. Alternatively, where the optical modulating unit 11 utilizes the acousto-optical effect, this can be done by applying to it an RF signal for selecting a wavelength other than the wavelength of the input light.

In this manner, the optical detecting unit 33 can detect whether the intensity of input light is a predetermined value or less. Therefore, when the intensity of the input light is the predetermined value or less, the modulation controlling unit 35 can prevent the optical modulating unit 11 from producing any output by controlling it in accordance with the output of the optical detecting unit 33. As a result, in the optical communication apparatus having the above configuration, neither ASE nor input light that is not modulated with a modulation signal is exit to the output port even when input light exists but no modulation signal exists.

Naturally, the optical detecting unit 33 does not output any signals when the intensity of input light is larger than the predetermined value so as to use the optical modulating unit 11. At this time, the optical modulating unit 11 operates normally as a modulating unit because it does not receive a signal from the modulation controlling unit 35.

Next, the optical communication apparatus according to the sixth embodiment will be explained based on the accompanying figure.

Figure 6:
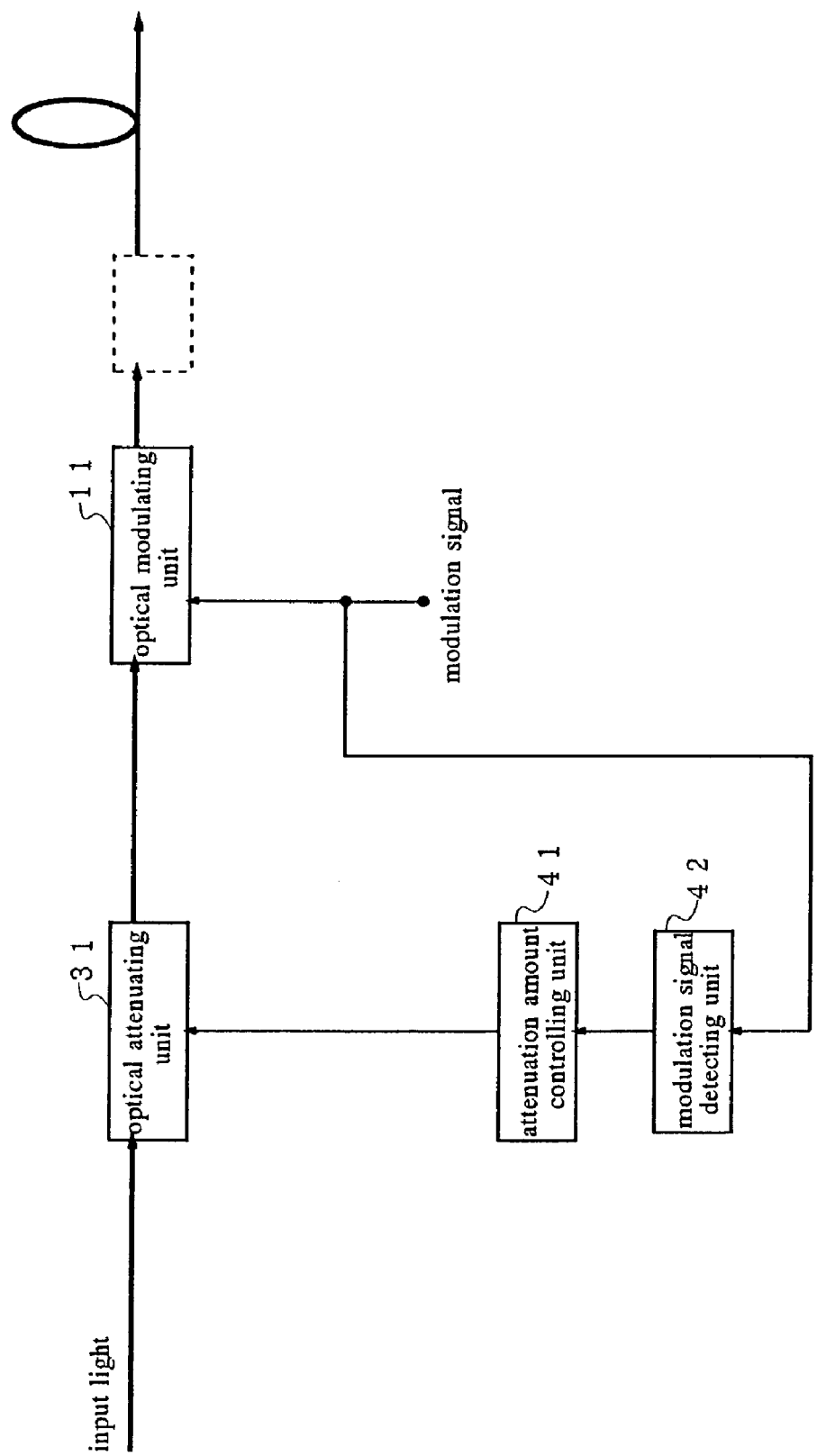
FIG. 6 is a block diagram of the optical communication apparatus according to the sixth embodiment.

In FIG. 6, this optical communication apparatus is composed of an optical attenuating unit 31, an optical modulating unit 11, an attenuation amount controlling unit 41, and a modulation signal detecting unit 42.

FIG. 6 shows a configuration in which light entered to an input port is exit to an output port via the optical attenuating unit 31 and the optical modulating unit 11.

On the other hand, as shown with broken lines in the same figure, the optical communication apparatus can be configured as the output light is exit to an output port via the optical modulating unit 11 and the optical attenuating unit 13.

Light entered to the input port is entered, via the optical attenuating unit 31, to the optical modulating unit 11, where it is modulated. A modulated optical signal that is exit from the optical modulating unit 11 is exit to the output port.

A modulation signal to be transmitted is inputted to not only the optical modulating unit 11 but also the modulation signal detecting unit 42. The modulation signal detecting unit 42 detects the intensity of the modulation signal and outputs a signal in accordance with the detected signal intensity. For example, the modulation signal detecting unit 42 outputs a signal when the signal intensity becomes a predetermined value or less. Alternatively, the modulation signal detecting unit 42 outputs a signal when the signal intensity becomes zero. The signal that is generated in accordance with the signal intensity is inputted to the attenuation amount controlling unit 41.

The attenuation amount controlling unit 41 controls the optical attenuating unit 31. That is, in accordance with a signal that is outputted from the modulation signal detecting unit 42, the attenuation amount controlling unit 41 controls the optical attenuating unit 31 so that it attenuates the input light to predetermined light intensity. Alternatively, where the optical attenuating unit 31 is an optical switch, in accordance with a signal that is outputted from the modulation signal detecting unit 33, the attenuation amount controlling unit 41 switches the output of the inputted light to an output terminal to which nothing is connected.

In this manner, the modulation signal detecting unit 42 can detect whether the intensity of a modulation signal is a predetermined value or less. Therefore, when the intensity of the modulation signal is the predetermined value or less, the attenuation amount controlling unit 41 can exit inputted light to the optical modulating unit 11 attenuating it to predetermined light intensity by controlling the optical attenuating unit 31 in accordance with the output of the modulation signal detecting unit 42. Alternatively, the attenuation amount controlling unit 41 can exit inputted light to a terminal that is not connected to the optical modulating unit 11. As a result, in the optical communication apparatus having the above configuration, ASE is not exit to the output port when no input light exists. Further, neither ASE nor input light that is not modulated with a modulation signal is exit to the output port even when input light exists but no modulation signal exists.

Naturally, the modulation signal detecting unit 42 does not output any signals when there is information to send and the intensity of a modulation signal to be transmitted is larger than the predetermined value. At this time, the attenuation amount controlling unit 41 controls the optical attenuating unit 31 so that it trajects the input light or switches to the terminal that is connected to the optical modulating unit 11.

The optical communication apparatus according to the seventh embodiment will be explained based on the accompanying figure.

Figure 7:
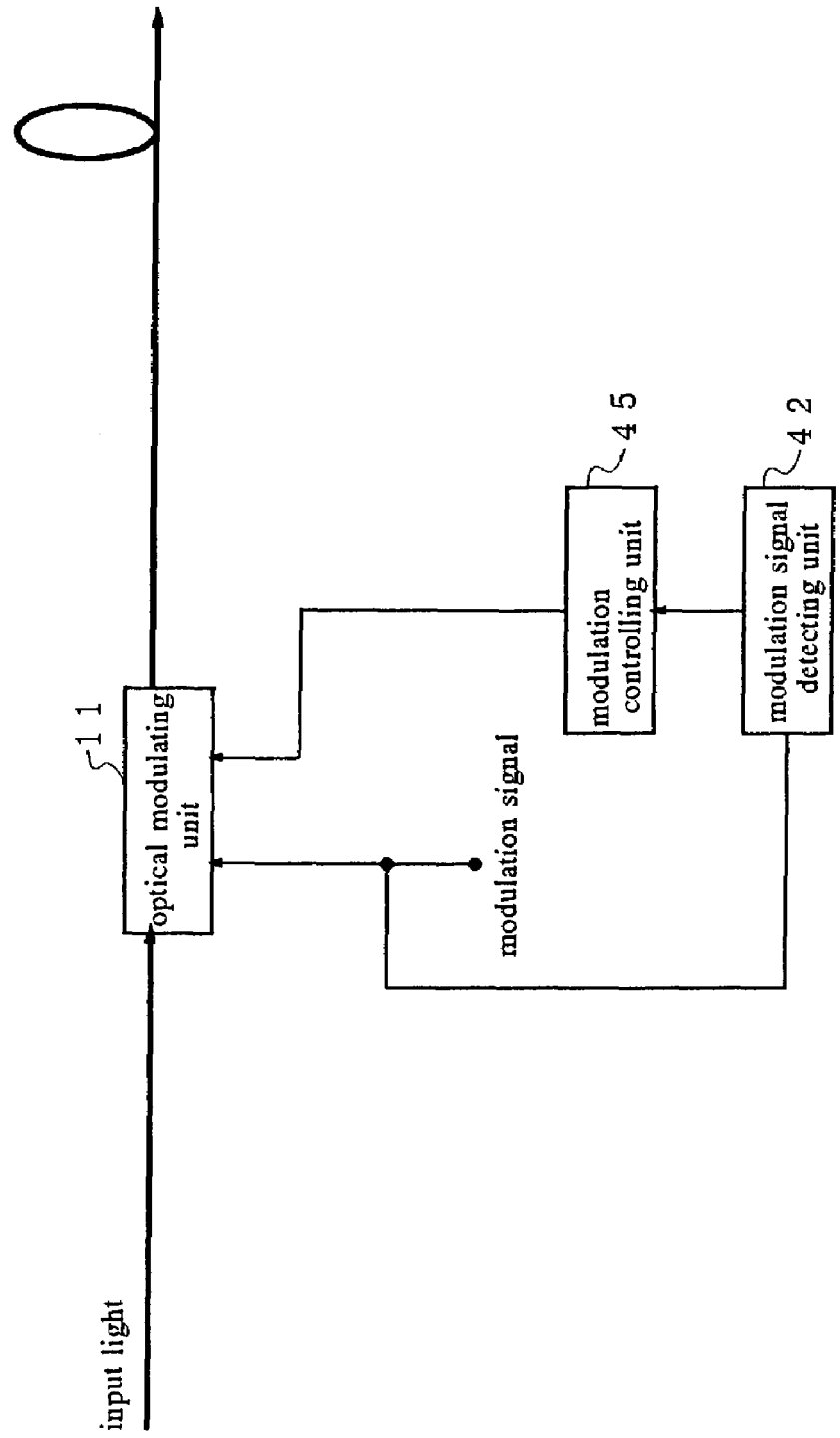
FIG. 7 is a block diagram of the optical communication apparatus according to the seventh embodiment.

In FIG. 7, this optical communication apparatus is composed of an optical modulating unit 11, a modulation signal detecting unit 42, and a modulation controlling unit 45.

Light entered to an input port is modulated by the optical modulating unit 11. A modulated optical signal is exit to an output port.

A modulation signal to be transmitted is inputted to not only the optical modulating unit 11 but also to the modulation signal detecting unit 42. The modulation signal detecting unit 42 outputs a signal in accordance with the intensity of the modulation signal. The signal that is outputted from the modulation signal detecting unit 42 is inputted to the modulation controlling unit 45.

The modulation controlling unit 45 controls the optical modulating unit 11. That is, in accordance with a signal that is outputted from the modulation signal detecting unit 42, the modulation controlling unit 45 controls the optical modulating unit 11 so that it attenuates the input light to the predetermined light intensity. For example, the modulation controlling unit 45 can prevent the optical modulating unit 11 from producing any outputs by not supplying any energy to it. Alternatively, where the optical modulating unit 11 is an MZ modulator, this can be done by shifting the phases of branched input light beams transmitting through two respective optical waveguides in the MZ modulator by forming a phase difference of 180°. As a further alternative, where the optical modulating unit 11 utilizes the acousto-optical effect, this can be done by applying to it an RF signal for selecting a wavelength other than the wavelength of the input light.

In this manner, the modulation signal detecting unit 42 can detect whether the intensity of a modulation signal is a predetermined value or less. Therefore, when the intensity of the modulation signal is the predetermined value or less, the modulation controlling unit 45 can prevent the optical modulating unit 11 from producing any outputs by controlling it. As a result, in the optical communication apparatus having the above configuration, neither ASE nor input light that is not modulated with a modulation signal is exit to the output port even when input light exists but no modulation signal exists.

Naturally, the modulation signal detecting unit 42 does not output any signals when there is information to send and the intensity of a modulation signal to be transmitted is larger than the predetermined value. At this time, the optical modulating unit 11 operates normally as a modulating unit because it does not receive a signal from the modulation controlling unit 45.

Next, the optical communication apparatus according to the eighth embodiment will be explained based on the accompanying figure.

Figure 8:
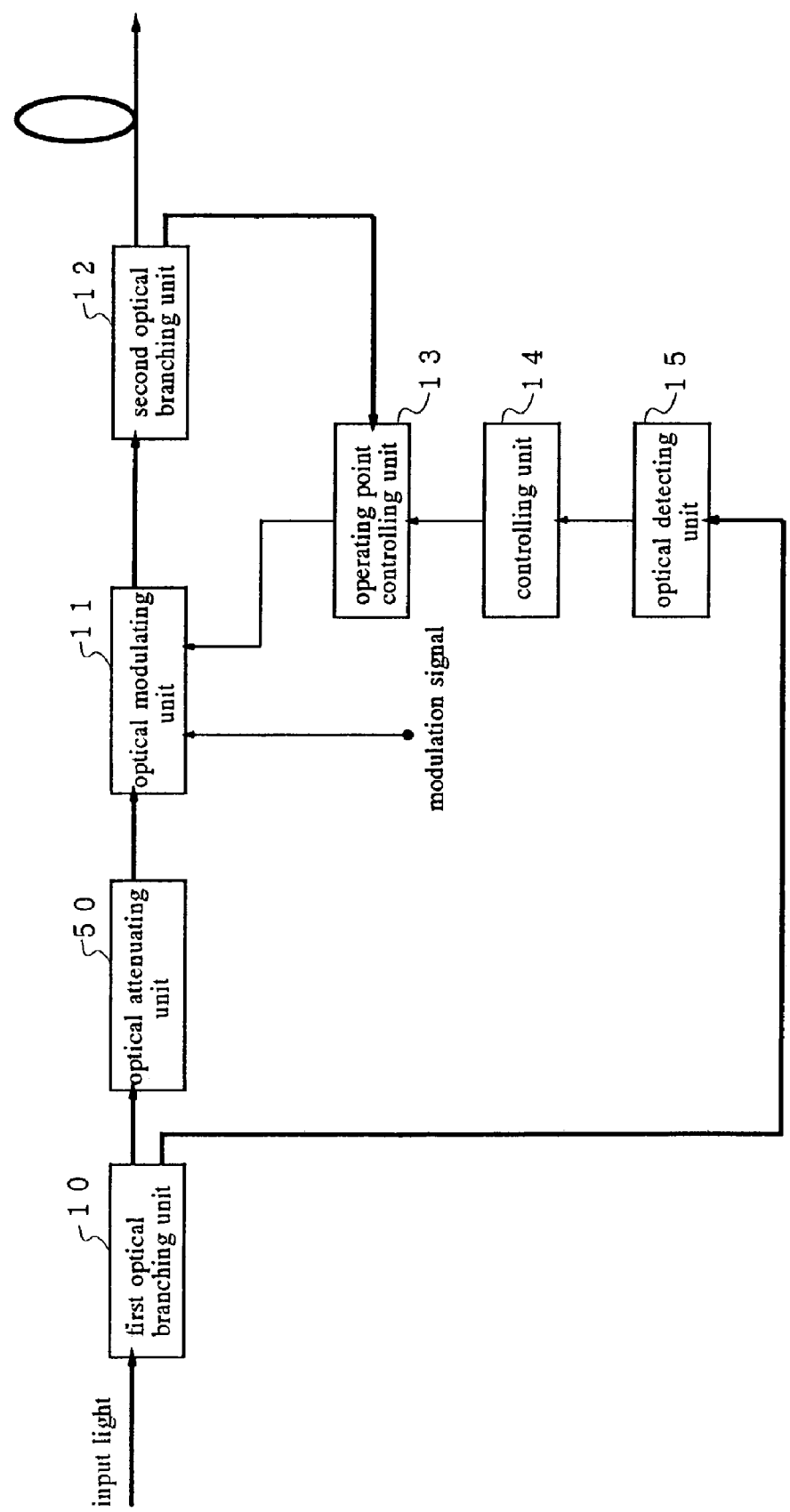
FIG. 8 is a block diagram of the optical communication apparatus according to the eighth embodiment.

As shown in FIG. 8, this optical communication apparatus is composed of optical branching unit 10 and 12, an optical attenuating unit 50, an optical modulating unit 11, an operating point controlling unit 13, a controlling unit 14, and an optical detecting unit 15.

Light entered to an input port is branched by the optical branching unit 10. First branched input light is entered to the optical attenuating unit 50. Output light of the optical attenuating unit 50 is modulated by the optical modulating unit 11. A modulated optical signal is branched by an optical branching unit 12. The first optical signal branched off by the optical branching unit 12 is exit to an output port. On the other hand, the second optical signal branched off by the optical branching unit 12 is entered to the operating point controlling unit 13.

The optical attenuating unit 50 trajects received input light or attenuates it to predetermined light intensity (including zero) in accordance with the intensity of the input light. Alternatively, the optical attenuating unit 50 is a single input/plural output optical switch. Where the optical attenuating unit 50 is such an optical switch, one output terminal is connected to the optical modulating unit 11 and the other output terminal(s) are not connected to anything.

On the other hand, the optical detecting unit 15 detects the intensity of second branched input light that has been branched off by the optical branching unit 10, and outputs a signal in accordance with the detected light intensity. The signal that is generated in accordance with the light intensity is inputted to the controlling unit 14.

The optical communication apparatus having the above configuration not only operates in the same manner as the optical communication apparatus according to the first embodiment of the invention but also does not exit ASE to the output port when no input light exists.

That is, the optical attenuating unit 50 judges whether the intensity of the light received is a predetermined value or less and attenuates the light received in accordance with the judgment result. Therefore, when the intensity of the light received is the predetermined value or less, the optical attenuating unit 50 attenuates it to predetermined intensity and outputs resulting light. Alternatively, where the optical attenuating unit 50 is an optical switch, when the intensity of the light received is the predetermined value or less, the optical attenuating unit 50 switches to outputting the light received to an output terminal to which nothing is connected. Therefore, the optical communication apparatus having the above configuration does not exit ASE to the output port when no input light exists.

Naturally, the optical attenuating unit 50 trajects input light and outputs it when the intensity of the input light is larger than the predetermined value so as to use the optical modulating unit 11. Alternatively, where the optical attenuating unit 50 is an optical switch, it switches to outputting the light received to the terminal that is connected to the optical modulating unit 11.

Note that, the optical attenuating unit 50 placed at the input of the optical modulating unit 11 in this optical communication apparatus as shown in FIG. 8 can also be placed at the output of the same.

Next, the optical communication apparatus according to the ninth embodiment will be explained based on the accompanying figure.

Figure 9:
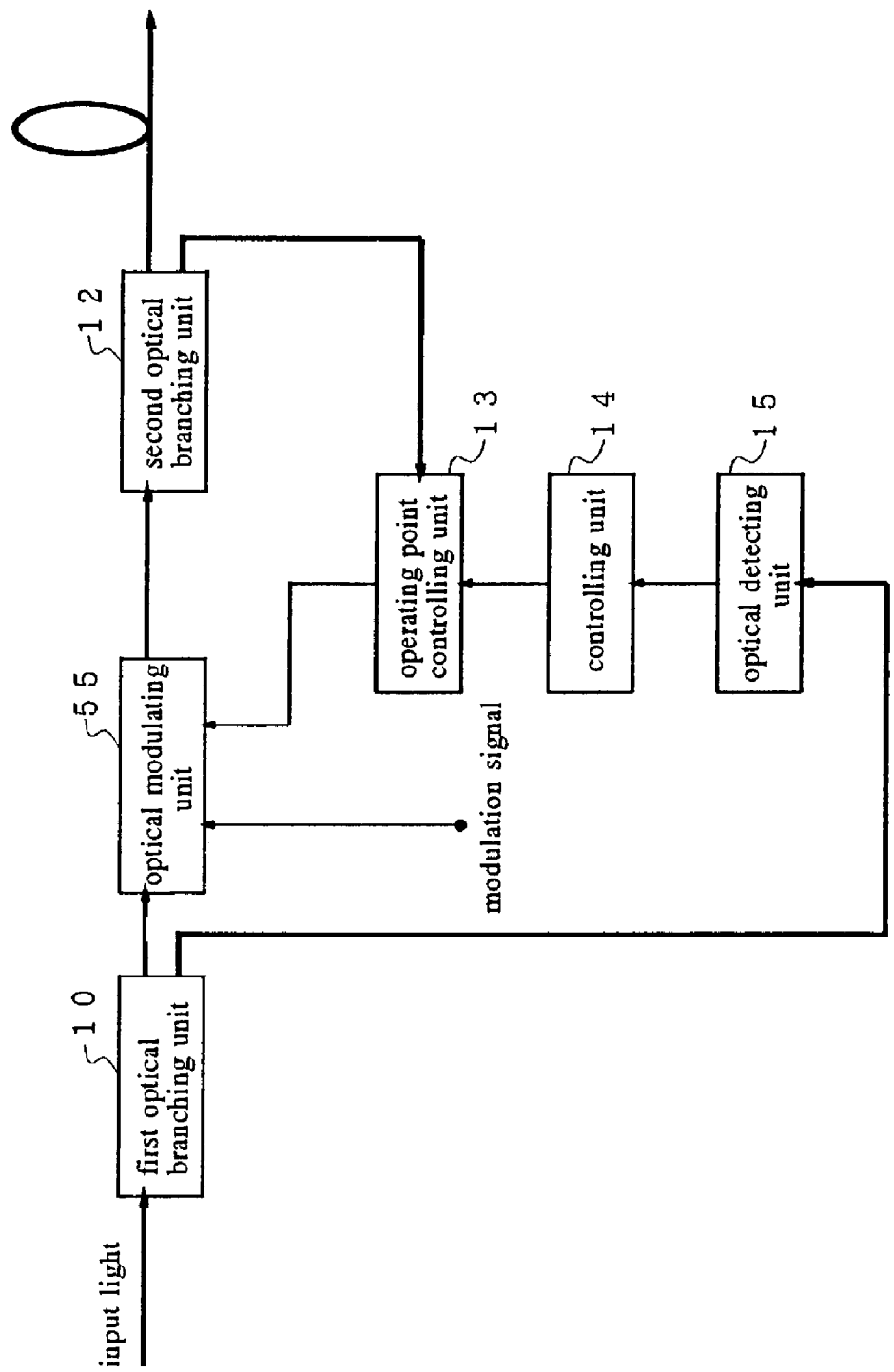
FIG. 9 is a block diagram of the optical communication apparatus according to the ninth embodiment.

As shown in FIG. 9, this optical communication apparatus is composed of optical branching unit 10 and 12, an optical modulating unit 55, an operating point controlling unit 13, a controlling unit 14, and an optical detecting unit 15.

Light entered to an input port is branched by the optical branching unit 10. First branched input light is modulated by the optical modulating unit 55 in accordance with a modulation signal to be transmitted. The modulated optical signal that is exit from the optical modulating unit 55 is branched by the optical branching unit 12 that branches light into two beams.

The optical modulating unit 55 controls whether to output a modulated optical signal, in accordance with the intensity of the modulation signal or the intensity of the light received.

The first optical signal branched off by the optical branching unit 12 is exit to an output port. On the other hand, the second optical signal branched off by the optical branching unit 12 is entered to the operating point controlling unit 13.

On the other hand, the optical detecting unit 15 detects the intensity of second branched input light that has been branched off by the optical branching unit 10, and outputs a signal in accordance with the detected light intensity. This signal is inputted to the controlling unit 14.

The optical communication apparatus having the above configuration not only operates in the same manner as the optical communication apparatus according to the first embodiment of the invention but also does not exit ASE to the output port when no input light exists.

The optical modulating unit 55 judges whether the intensity of the light received is a predetermined value or less or whether the intensity of the modulation signal is a predetermined value or less. As a result, the optical modulating unit 55 produces no output when the intensity of the light received is the predetermined value or less or the intensity of the modulation signal is the predetermined value or less. For example, it is possible to prevent the optical modulating unit 55 from producing any outputs by not supplying energy to it. Alternatively, where the optical modulating unit 11 is an MZ modulator, this can be done by shifting the phases of branched light beams transmitting through two respective optical waveguides in the MZ modulator by forming a phase difference of 180°. Alternatively, where the optical modulating unit 11 utilizes the acousto-optical effect, this can be done by applying to it an RF signal for selecting a wavelength other than the wavelength of the input light. Therefore, the optical communication apparatus having the above configuration does not exit ASE nor input light that is not modulated with a modulation signal even when input light exists but no modulation signal exists.

Naturally, the optical modulating unit 55 operates normally as a modulating unit when the intensity of the input light is larger than the predetermined value or when the intensity of the modulation signal is larger than the predetermined value so as to use the optical modulating unit 55.

Note that, the controlling unit 14 controlled by the optical communication apparatus according to the input light of the optical modulating unit 55 as shown in FIG. 9 can also be controlled according to the output light of the optical modulating unit 55 or a modulation signal.

Next, the optical communication apparatus according to the tenth embodiment will be explained based on the accompanying figure.

Figure 10:
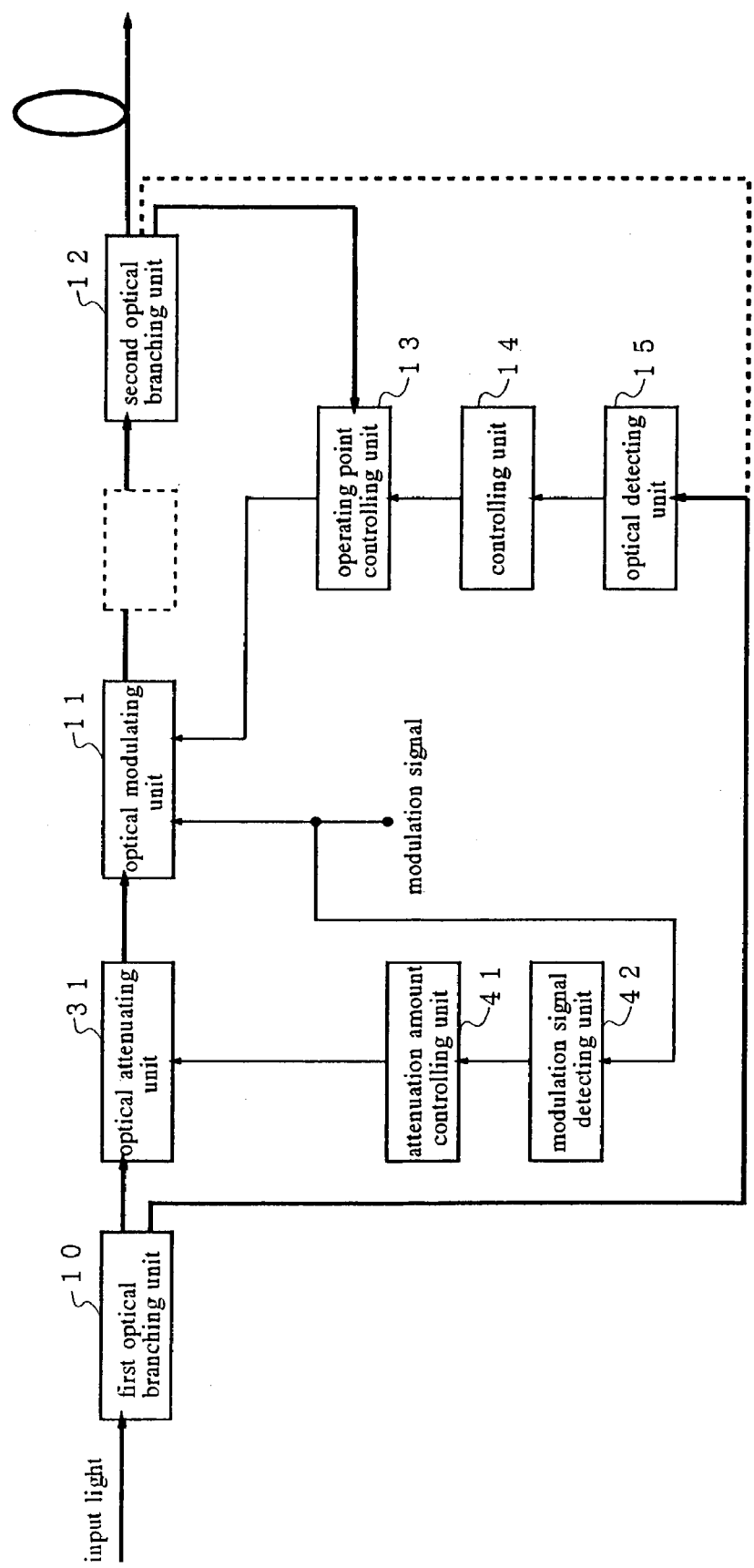
FIG. 10 is a block diagram of the optical communication apparatus according to the tenth embodiment.

In FIG. 10, this optical communication apparatus is composed of optical branching unit 10 and 12, an optical modulating unit 11, an operating point controlling unit 13, a controlling unit 14, an optical detecting unit 15, an optical attenuating unit 31, an attenuation amount controlling unit 41, and a modulation signal detecting unit 42.

Light entered to an input port is branched by the optical branching unit 10. First branched input light is entered, via the optical attenuating unit 31, to the optical modulating unit 11, where it is modulated. A modulated optical signal is branched by the optical branching unit 12.

The first optical signal branched off by the optical branching unit 12 is exit to an output port. On the other hand, the second optical signal branched off by the optical branching unit 12 is entered to the operating point controlling unit 13.

On the other hand, the optical detecting unit 15 detects the intensity of second branched input light that has been branched off by the optical branching unit 10, and outputs a signal in accordance with the detected light intensity. The signal that is generated in accordance with the light intensity is inputted to the controlling unit 14.

A modulation signal to be transmitted is inputted to not only the optical modulating unit 11 but also the modulation signal detecting unit 42. The modulation signal detecting unit 42 detects the intensity of the modulation signal and outputs a signal in accordance with the detected signal intensity, which is inputted to the attenuation amount controlling unit 41.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it keeps the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value only based on the output of the optical modulating unit 11 that is entered via the optical branching unit 12.

Further, the modulation signal detecting unit 42 can detect whether the intensity of a modulation signal is a predetermined value or less. Therefore, when the intensity of the modulation signal is the predetermined value or less, the attenuation amount controlling unit 41 can exit inputted light to the optical modulating unit 11 attenuating it to predetermined light intensity by controlling the optical attenuating unit 31 in accordance with the output of the modulation signal detecting unit 42. Alternatively, the attenuation amount controlling unit 41 can exit the input light to a terminal that is not connected to the optical modulating unit 11. As a result, in the optical communication apparatus having the above configuration, ASE is not exit to the output port when no input light exists. Further, neither ASE nor input light that is not modulated with a modulation signal is exit to the output port even when input light exists but no modulation signal exists.

Naturally, the modulation signal detecting unit 42 does not output any signals when there is information to send and the intensity of a modulation signal to be transmitted is larger than the predetermined value. At this time, the attenuation amount controlling unit 41 controls the optical attenuating unit 31 so that it trajects input light or causes the optical attenuating unit 11 to switch to supplying the light received to the terminal that is connected to the optical modulating unit 11.

Note that, in this optical communication apparatus, the controlling unit 14 can be controlled according to the detection done by the optical detecting unit 15 on light output from the optical modulating unit 11 together with having the optical attenuating unit 31 placed at the output of optical modulating unit 11, as shown in broken lines, instead of having the optical detecting unit 15 detect input light together with having the optical attenuating unit 31 placed at the input of optical modulating unit 11, as shown in FIG. 10.

Next, the optical communication apparatus according to the eleventh embodiment will be explained based on the accompanying figure.

Figure 11:
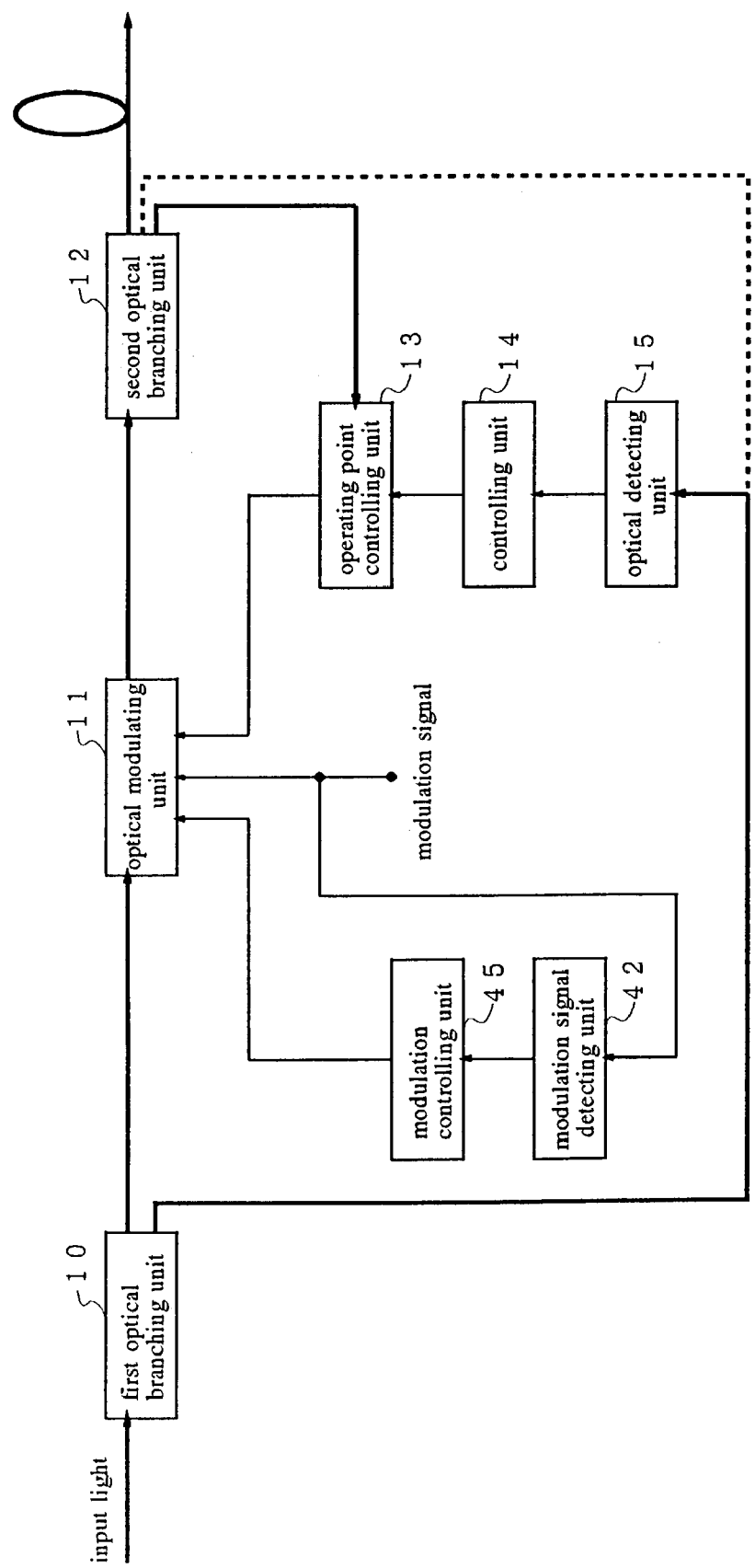
FIG. 11 is a block diagram of the optical communication apparatus according to the eleventh embodiment.

In FIG. 11, this optical communication apparatus is composed of optical branching unit 10 and 12, an optical modulating unit 11, an operating point controlling unit 13, a controlling unit 14, an optical detecting unit 15, a modulation signal detecting unit 42, and a modulation controlling unit 45.

Light entered to an input port is branched by the optical branching unit 10. First branched input light is entered to the optical modulating unit 11, where it is modulated. A modulated optical signal is branched by the optical branching unit 12.

The first optical signal branched off by the optical branching unit 12 is exit to an output port. On the other hand, the second optical signal branched off by the optical branching unit 12 is entered to the operating point controlling unit 13.

On the other hand, the optical detecting unit 15 detects the intensity of second branched input light that has been branched off by the optical branching unit 10, and outputs a signal in accordance with the detected light intensity, which is inputted to the controlling unit 14.

A modulation signal to be transmitted is inputted to not only the optical modulating unit 11 but also the modulation signal detecting unit 42. The modulation signal detecting unit 42 outputs a signal in accordance with the intensity of the modulation signal, and the signal that is outputted is inputted to the modulation controlling unit 45.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it keeps the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value only based on the output of the optical modulating unit 11 that is entered via the optical branching unit 12.

Further, the modulation signal detecting unit 42 can detect whether the intensity of a modulation signal is a predetermined value or less. Therefore, when the intensity of the modulation signal is the predetermined value or less, the modulation controlling unit 45 can prevent the optical modulating unit 11 from producing any output by controlling the optical modulating unit 11. As a result, in the optical communication apparatus having the above configuration, neither ASE nor input light that is not modulated with a modulation signal is exit to the output port even when input light exists but no modulation signal exists.

Naturally, the modulation signal detecting unit 42 does not output any signals when there is information to send and the intensity of a modulation signal to be transmitted is larger than the predetermined value. At this time, the optical modulating unit 11 operates normally as a modulating unit because it does not receive a signal from the modulation controlling unit 45.

Note that, the controlling unit 14 controlled by the optical communication apparatus according to the input light of the optical modulating unit 11 as shown in FIG. 11 can also be controlled according to the output light of the optical modulating unit 11 or a modulation signal as shown with broken lines.

Next, the optical communication apparatus according to the twelfth embodiment will be explained based on the accompanying figure.

Figure 12:
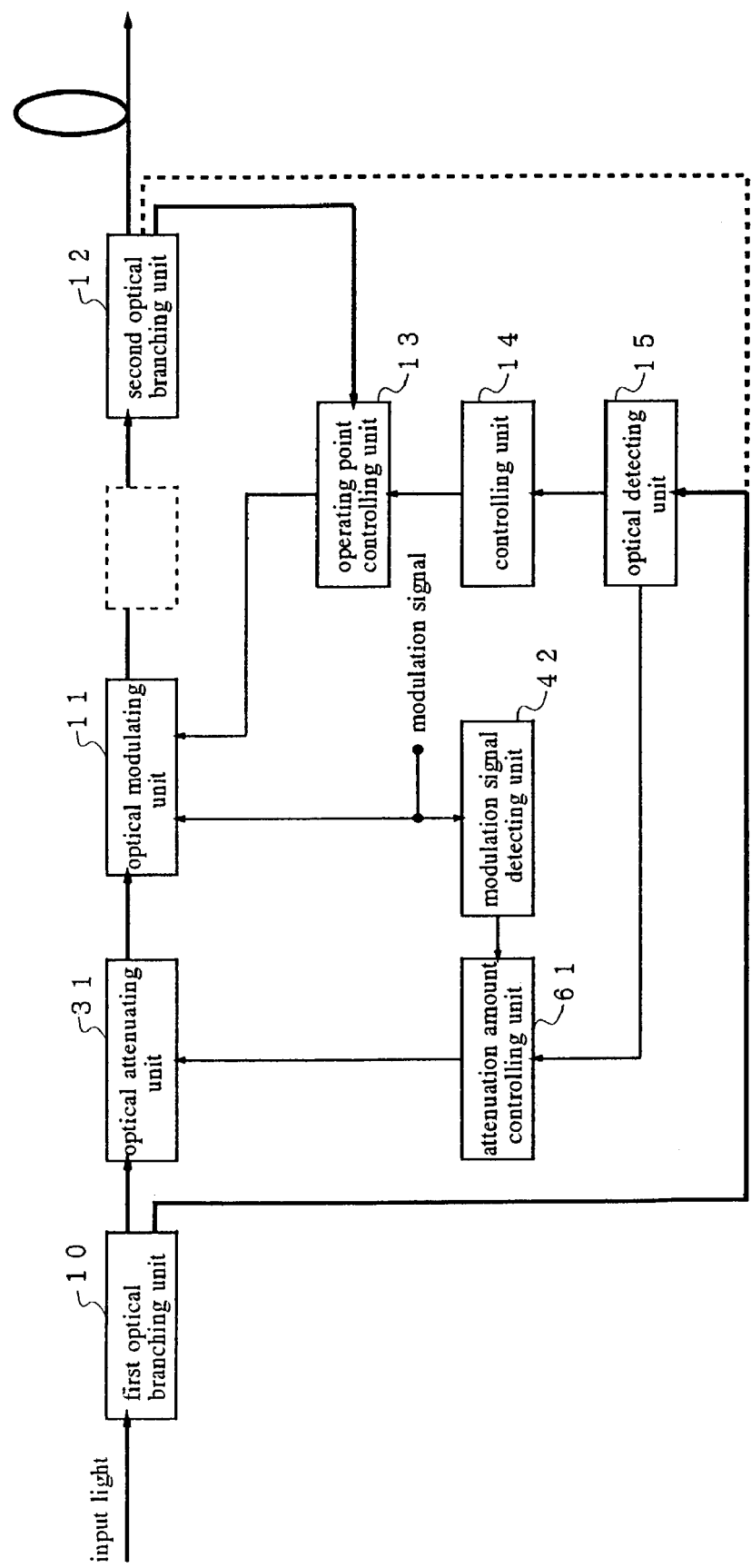
FIG. 12 is a block diagram of the optical communication apparatus according to the twelfth embodiment.

In FIG. 12, this optical communication apparatus is composed of optical branching unit 10 and 12, an optical modulating unit 11, an operating point controlling unit 13, a controlling unit 14, an optical detecting unit 15, an optical attenuating unit 31, an attenuation amount controlling unit 61, and a modulation signal detecting unit 42.

Light entered to an input port is branched by the optical branching unit 10. First branched input light is entered, via the optical attenuating unit 31, to the optical modulating unit 11, where it is modulated. A modulated optical signal is branched by the optical branching unit 12.

The first optical signal branched off by the optical branching unit 12 is exit to an output port. On the other hand, the second optical signal branched off by the optical branching unit 12 is entered to the operating point controlling unit 13.

On the other hand, the optical detecting unit 15 detects the intensity of second branched input light that has been branched off by the optical branching unit 10, and outputs a signal in accordance with the detected light intensity, which is inputted to the controlling unit 14 and the attenuation amount controlling unit 61.

A modulation signal to be transmitted is inputted to not only the optical modulating unit 11 but also the modulation signal detecting unit 42, where the intensity of the modulation signal is detected and a signal in accordance with the detected signal intensity is outputted. The output signal in accordance with the signal intensity is inputted to the attenuation amount controlling unit 61.

The attenuation amount controlling unit 61 controls the optical attenuating unit 31. That is, the attenuation amount controlling unit 61 calculates the AND of the signal of the optical detecting unit 15 and the signal of the modulation signal detecting unit 42, and controls the optical attenuating unit 31 so that it attenuates the light received to predetermined light intensity. Alternatively, where the optical attenuating unit 31 is an optical switch, in accordance with the signal of the optical detecting unit 15, the attenuation amount controlling unit 61 switches the output of the inputted light to an output terminal to which nothing is connected.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it can keep the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value only based on the output of the optical modulating unit 11 that is entered via the optical branching unit 12.

Further, the modulation signal detecting unit 42 can detect whether the intensity of a modulation signal is a predetermined value or less. The attenuation amount controlling unit 61 also receives a signal from the optical detecting unit 15 and calculates the AND of this signal and a signal of the modulation signal detecting unit 42. Therefore, when the intensity of the input light is the predetermined value or less or when the intensity of the modulation signal is the predetermined value or less, the attenuation amount controlling unit 61 can output inputted light to the optical modulating unit 11 after being attenuated to predetermined light intensity by controlling the optical attenuating unit 31. Alternatively, the attenuation amount controlling unit 61 can have the optical attenuating unit 31 exit the light received to a terminal that is not connected to the optical modulating unit 11. As a result, in the optical communication apparatus having the above configuration, ASE is not exit to the output port when no input light exists. Further, neither ASE nor input light that is not modulated with a modulation signal is exit to the output port even when input light exists but no modulation signal exists.

Naturally, when there is information to send, the intensity of a modulation signal to be transmitted is larger than the predetermined value, and the intensity of input light is larger than the predetermined value, the attenuation amount controlling unit 61 controls the optical attenuating unit 31 so that it trajects the input light or switches the output of the inputted light to the terminal that is connected to the optical modulating unit 11.

Note that, in this optical communication apparatus, the controlling unit 14 and attenuation amount controlling unit 61 can be controlled according to the detection done by the optical detecting unit 15 on light output from the optical modulating unit 11 together with having the optical attenuating unit 31 placed at the output of optical modulating unit 11, as shown in broken lines, instead of having the optical detecting unit 15 detect input light together with having the optical attenuating unit 31 placed at the input of optical modulating unit 11, as shown in FIG. 12.

Next, the optical communication apparatus according to the thirteenth embodiment will be explained based on the accompanying figure.

Figure 13:
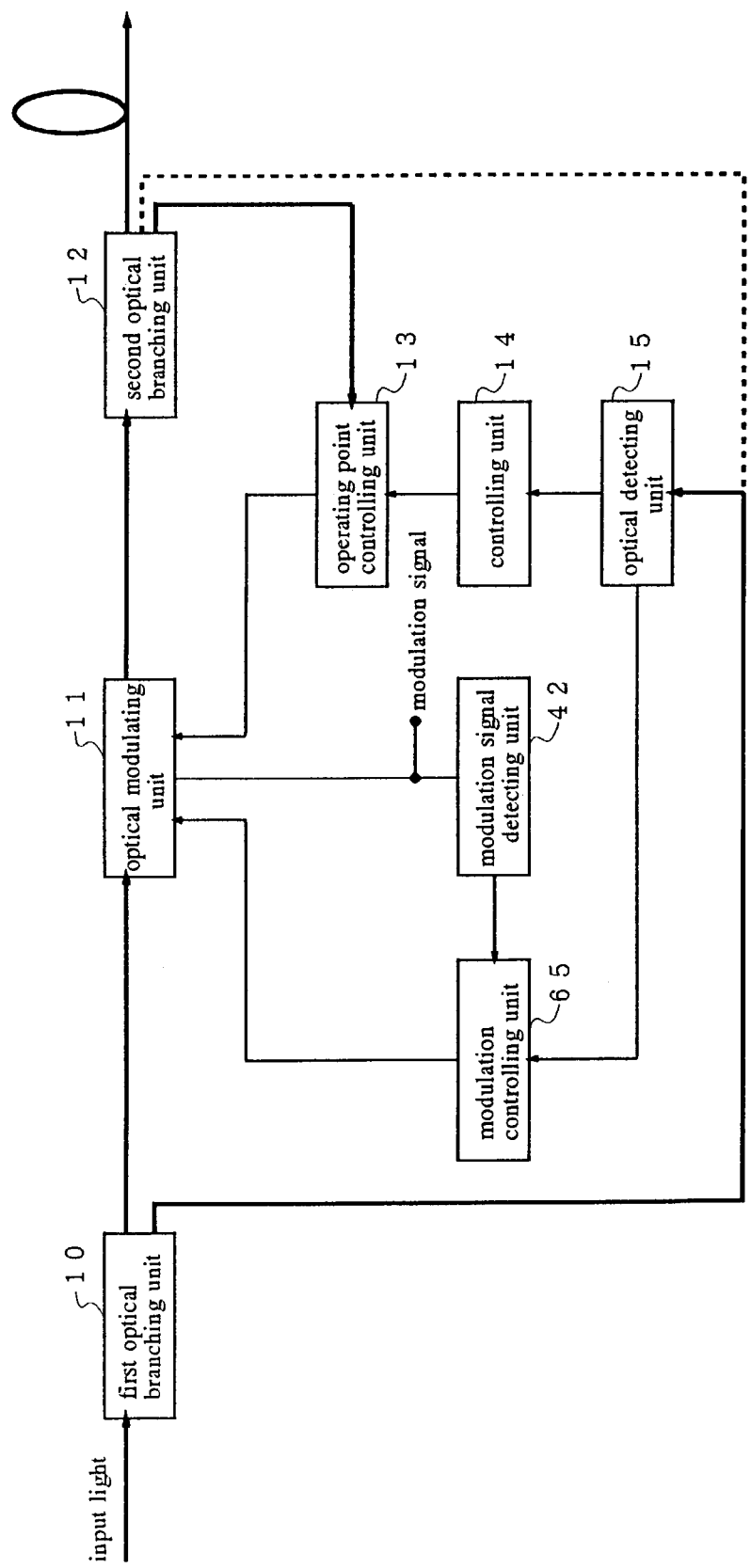
FIG. 13 is a block diagram of the optical communication apparatus according to the thirteenth embodiment.

In FIG. 13, this optical communication apparatus is composed of optical branching unit 10 and 12, an optical modulating unit 11, an operating point controlling unit 13, a controlling unit 14, an optical detecting unit 15, a modulation signal detecting unit 42, and a modulation controlling unit 65.

Light entered to an input port is branched by the optical branching unit 10. First branched input light is entered to the optical modulating unit 11, where it is modulated. A modulated optical signal is branched by the optical branching unit 12.

The first optical signal branched off by the optical branching unit 12 is outputted to an output port. On the other hand, the second optical signal branched off by the optical branching unit 12 is entered to the operating point controlling unit 13.

On the other hand, the optical detecting unit 15 detects the intensity of second branched input light that has been branched off by the optical branching unit 10, and outputs a signal in accordance with the detected light intensity. The output signal in accordance with the light intensity is inputted to the controlling unit 14 and the modulation controlling unit 65.

A modulation signal to be transmitted is inputted to not only the optical modulating unit 11 but also the modulation signal detecting unit 42. The modulation signal detecting unit 42 outputs a signal in accordance with the intensity of the modulation signal, which is inputted to the modulation controlling unit 65.

The modulation controlling unit 65 controls the optical modulating unit 11. That is, the modulation controlling unit 65 calculates the AND of the signal from the optical detecting unit 15 and the signal from the modulation signal detecting unit 42, and controls the optical modulating unit 11 so that it attenuates the light received to a predetermined light intensity. For example, the modulation controlling unit 65 can prevent the optical modulating unit 11 from producing any outputs by not supplying energy to it. Alternatively, where the optical modulating unit 11 is an MZ modulator, the modulation controlling unit 65 can prevent the optical modulating unit 11 from producing any outputs by shifting the phases of branched input light beams transmitting through two respective optical waveguides in the MZ modulator so as to form a phase difference of 180°. As a further alternative, where the optical modulating unit 11 utilizes the acousto-optical effect, the modulation controlling unit 65 can prevent the optical modulating unit 11 from producing any outputs by applying to it an RF signal for selecting a wavelength other than the wavelength of the input light.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it keeps the operating point stable. As a result, in the optical communication apparatus having the above configuration, the operating point can be kept stable even when input light is temporarily non-existent.

Naturally, the optical detecting unit 15 does not output any signals when the intensity of input light is larger than the predetermined value so as to use the optical modulating unit 11. Therefore, the operating point controlling unit 13 controls the operating point to the optimum value based only on the output of the optical modulating unit 11 that is entered via the optical branching unit 12.

Further, the modulation signal detecting unit 42 can detect whether the intensity of a modulation signal is a predetermined value or less. The modulation controlling unit 65 also receives a signal from the optical detecting unit 15 and calculates the AND of this signal and a signal of the modulation signal detecting unit 42. Therefore, when the intensity of the input light is the predetermined value or less or when the intensity of the modulation signal is the predetermined value or less, the modulation controlling unit 65 can prevent the optical modulating unit 11 from producing outputs by controlling the optical modulating unit 11. As a result, in the optical communication apparatus having the above configuration, neither ASE nor input light that is not modulated with a modulation signal is outputted to the output port even when input light exists but no modulation signal exists.

Naturally, neither the modulation signal detecting unit 42 nor the optical detecting unit 15 output a signal to the modulation controlling unit 65 when there is information to send, the intensity of a modulation signal to be transmitted is larger than the predetermined value, and the intensity of input light is larger than the predetermined value. As a result, the optical modulating unit 11 operates normally as a modulating unit because it does not receive a signal from the modulation controlling unit 65.

Note that, the controlling unit 14 controlled by the optical communication apparatus according to the input light of the optical modulating unit 11 as shown in FIG. 13 can also be controlled according to the output light of the optical modulating unit 11 or a modulation signal as shown with broken lines.

Next, the optical communication apparatus according to the fourteenth embodiment will be explained based on the accompanying figure.

Figure 14:
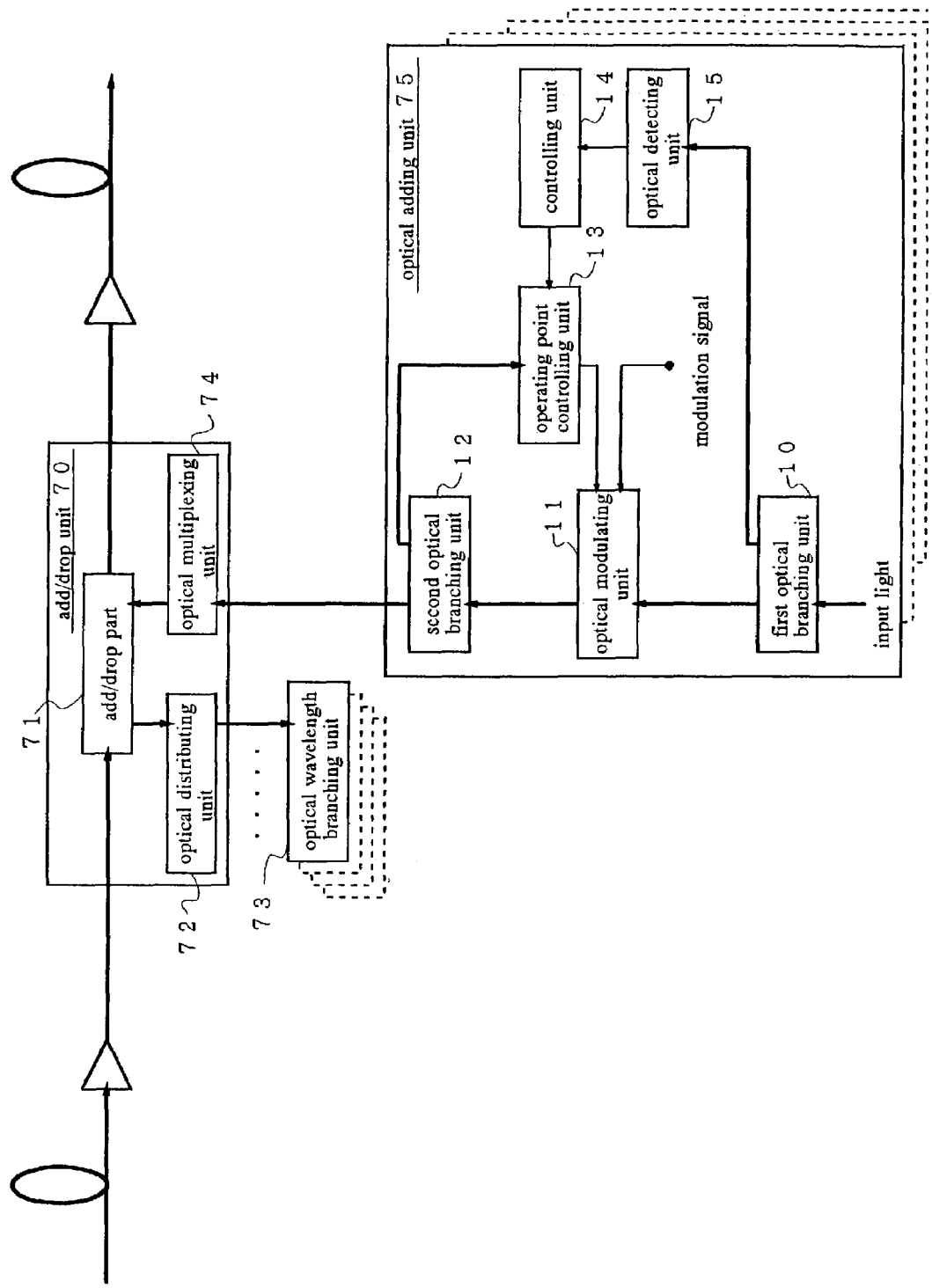
FIG. 14 is a block diagram of the optical add/drop apparatus according to the fourteenth embodiment.

As shown in FIG. 14, this optical add/drop apparatus is composed of an add/drop unit 70, an optical wavelength branching unit 73, and an optical adding unit 75.

Actually, the optical add/drop apparatus is provided with optical wavelength branching unit 73 and optical adding unit 75 in the number equivalent to the number of wavelengths of light beams to be added or dropped. However, each optical wavelength branching unit 73 is the same in configuration and different only in the wavelength of light on which to perform a receiving operation, and each optical adding unit 75 is the same in configuration and different only in the wavelength of light to be added. Therefore, in FIG. 14, only one of the plurality of optical wavelength branching unit 73 and only one of the plurality of optical adding unit 75 are shown by solid lines and the other unit are shown with broken lines.

The add/drop unit 70 is connected to an optical transmission line for transmitting through a wavelength-division multiplexed optical signal, and adds and drops optical signals of at least one wavelength to and from an optical signal transmitting through the optical transmission line. When dropping, optical signals are dropped to optical wavelength branching unit 73 via an optical distributing unit 72 that distributes optical signals in accordance with the number of optical wavelength branching unit 73. When adding, an optical multiplexing unit 74 multiplexes adding optical signals coming from respective optical adding unit 75 wavelength-division multiplexes the multiplexed addition light with an optical signal trajecting the optical add/drop apparatus and outputted to the optical transmission line.

The optical wavelength branching unit 73 performs receiving operations on distributed optical signals of respective wavelengths. On the other hand, the optical adding unit 75 generates addition light beams to be added to an optical signal on the optical transmission line.

The configuration of each optical adding unit 75 will be described below, which is composed of optical branching unit 10 and 12, an optical modulating unit 11, an operating point controlling unit 13, a controlling unit 14, and an optical detecting unit 15.

Input light of a particular wavelength that is entered to an input port is branched by the optical branching unit 10. First branched input light that has been branched off by the optical branching unit 10 is modulated by the optical modulating unit 11. A modulated optical signal is branched by the optical branching unit 12. Each particular wavelength is different among the respective optical adding unit 75.

The first optical signal branched off by the optical branching unit 12 is exit to an output port and entered to the optical multiplexing unit 74. On the other hand, the second optical signal branched off by the optical branching unit 12 is entered to the operating point controlling unit 13 that controls the operating point of the optical modulating unit 11.

On the other hand, the optical detecting unit 15 detects the intensity of second branched input light that has been branched off by the optical branching unit 10, and outputs a signal in accordance with the detected light intensity, which is inputted to the controlling unit 14.

In this manner, the optical detecting unit 15 can detect whether the intensity of input light is a predetermined value or less. Therefore, when the intensity of the input light is the predetermined value or less, the controlling unit 14 can control, in accordance with the output of the optical detecting unit 15, the operating point controlling unit 13 so that it can keep the operating point stable. As a result, in the optical add/drop apparatus having the above configuration, the operating point of the optical adding unit 75 can be kept stable even when the optical adding unit 75 has no input light because no addition light is to be supplied to the add/drop unit 70.

Naturally, the optical detecting unit 15 does not output any signals when the intensity of input light is larger than the predetermined value to generate addition light by the optical adding unit 75. Therefore, the operating point controlling unit 13 controls the operating point to the optimum value only based on the output of the optical modulating unit 11 that is entered via the optical branching unit 12.

Note that, the optical communication apparatus according to the first embodiment applied as optical adding unit 75 in the fourteenth embodiment can be replaced by the optical communication apparatuses in the second through the thirteenth embodiments.

Next, the fifteenth embodiment will be explained.

First, the configuration of the fifteenth embodiment will be described.

Figure 15:
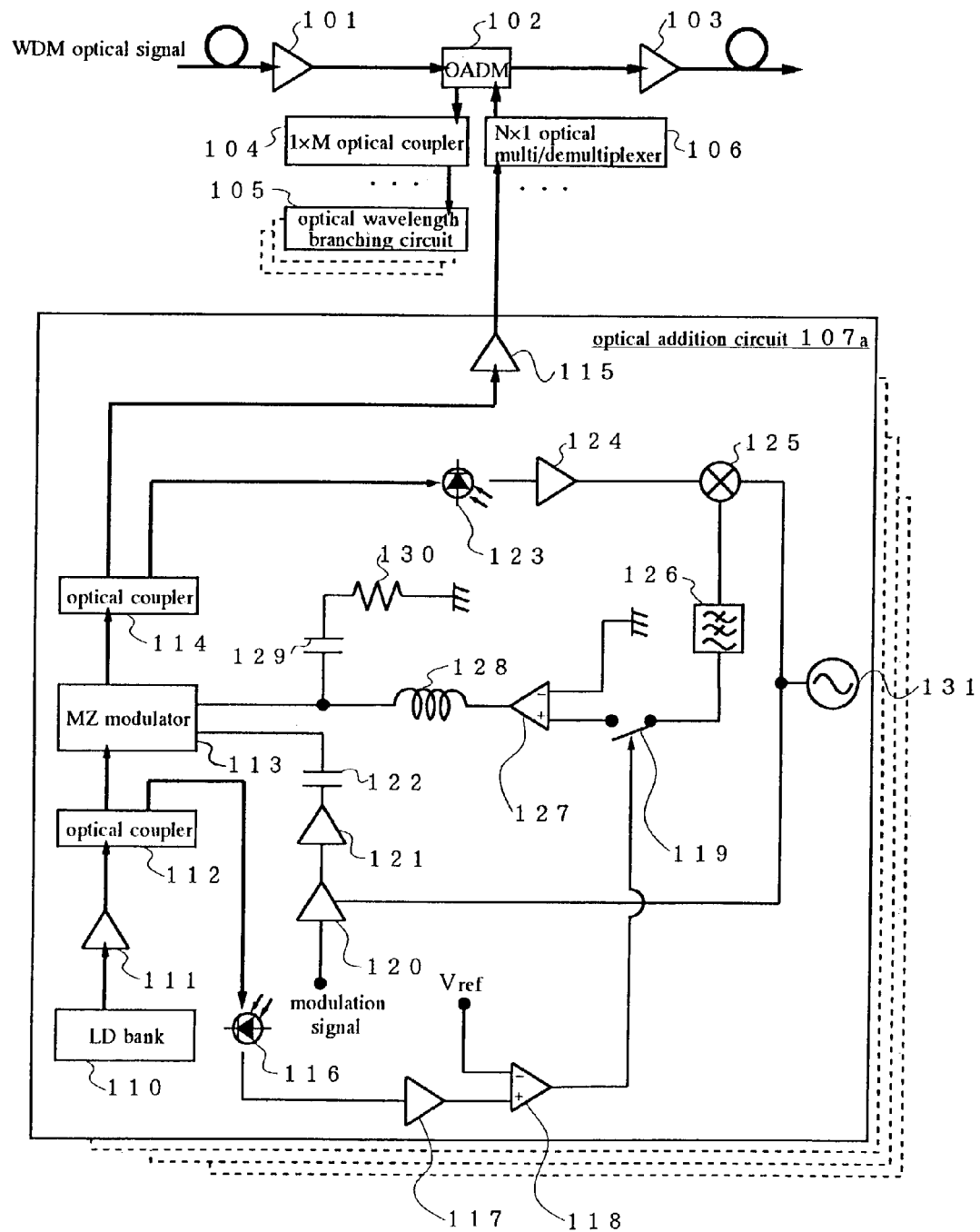
FIG. 15 is a block diagram of the optical add/drop apparatus according to the fifteenth embodiment.

In FIG. 15, this optical add/drop apparatus is composed of optical amplifiers 101 and 103, an OADM 102, an 1×M optical coupler 104, M optical wavelength branching circuits 105, an N×1 optical multi/demultiplexer 106, and N optical addition circuits 107a.

Although this optical add/drop apparatus has the M optical wavelength branching circuits 105 and the N optical addition circuits 107a, in FIG. 15 only one of the M optical wavelength branching circuits 105 and only one of the N optical addition circuits 107a are shown by solid lines and the other circuits are shown with broken lines because the circuits of each group have the same configuration.

A wavelength-division multiplexed optical signal transmitting through an optical transmission line enters the optical add/drop apparatus and is amplified by the amplifier 101 that amplifies an optical signal to predetermined light intensity. The amplified optical signal is entered to the OADM 102 that adds or drops a wavelength-division multiplexed optical signal. Signal light beams of predetermined wavelengths that have been dropped by the OADM 102 are entered to the 1×M optical coupler 104 that divides the optical signal(s) into as many optical wavelength branching circuits there are. The optical signal(s) distributed by the 1×M optical coupler 104 are entered to and performed receiving operations on optical signals of respective wavelengths in the optical wavelength branching circuits 105. On the other hand, optical signals to be added in the OADM 102 are generated by the optical addition circuits 107a, which are provided in N, that is, the number of optical signals to be added in the OADM 102. The optical signals to be added and an optical signal that has not been dropped in the OADM 102 are wavelength-division multiplexed with each other, and a resulting optical signal is amplified by the optical amplifier 103 and then outputted to the optical transmission line.

Each optical addition circuit 107a is composed of a laser diode bank (hereinafter abbreviated as "LD bank") 110, optical amplifiers 111 and 115, optical couplers 112 and 114, an MZ modulator 113, PDs 116 and 123, amplifiers 117 and 121, a comparator 118, a switch 119, a variable gain amplifier 120, a coupling capacitor 122, a buffer amplifier 124, a multiplier 125, an LPF 126, a differential amplifier 127, an inductor 128, a capacitor 129, a resistor 130, and a low-frequency oscillator 131.

The circuit composed of the variable gain amplifier 120, the amplifier 121, the coupling capacitor 122, the PD 123, the buffer amplifier 124, the multiplier 125, the LPF 126, the differential amplifier 127, the inductor 128, the capacitor 129, the resistor 130, and the low-frequency oscillator 131 is called an operating point control circuit.

In FIG. 15, the LD bank 110 can exit laser beams of a plurality of wavelengths L1–L8 corresponding to the wavelengths for wavelength-division multiplexing. The wavelength of light to be exited actually is selected in accordance with a detection signal that is generated by detecting available wavelengths of the optical transmission line with a wavelength monitor (not shown in FIG. 15). For example, the LD bank 110 exits light of a wavelength L2, which is entered to the optical amplifier 111. Amplified light is branched into two beams by the optical coupler 112, and first branched light is entered to the MZ modulator 113.

A modulation signal and a low-frequency signal of a predetermined frequency f0 that is outputted from the low-frequency oscillator 131 are inputted to the variable gain amplifier 120. The variable gain amplifier 120 amplitude-modulates and outputs the signal received. The output signal is inputted to one modulation-input terminal of the MZ modulator 113 via the amplifier 121 which gains a predetermined signal level and the coupling capacitor 122.

The resistor 130 and a bias T circuit that is composed of the inductor 128 and the capacitor 129 are connected to the other modulation-input terminal of the MZ modulator 113.

The MZ modulator 113 modulates the light of the wavelength L2 that is exit from the LD bank 110 into an optical signal with the signal supplied from the drive circuit and outputs it.

Part of the output light of the MZ modulator 113 is branched off by the optical coupler 114 and thereby taken out. The other part of the output light is amplified by the optical amplifier 115 and then entered to the above-mentioned N×1 optical multi/demultiplexer 106. The branched part of the output light is detected by the PD 123. A detection signal is amplified by the buffer amplifier 124 that selectively amplifies a frequency component of f0, and is inputted to the multiplier 125. The low-frequency signal that is outputted from the low-frequency oscillator 131 is also inputted to the multiplier 125. The multiplier 125 compares the phases of the input signal supplied from the buffer amplifier 124 and the low-frequency signal supplied from the low-frequency oscillator 131, and outputs a signal in accordance with a phase difference. The multiplexer 125 detects the low-frequency signal of the predetermined frequency f0 that was superimposed by the variable gain amplifier 120.

The output signal of the multiplier 125 is inputted to one input terminal of the differential amplifier 127 via the LPF 126 that allows passage of a frequency component of the predetermined frequency f0 or less and the switch 119. The other input terminal of the differential amplifier 127 is grounded. An output of the differential amplifier 127 is inputted to the inductor 128 of the bias T circuit as an error signal to be used for moving the operating point, and the bias value is variably controlled so as to correct the operating point.

On the other hand, second branched light that has been branched off by the optical coupler 112 is entered to the PD 116, which outputs an electrical signal that is in proportion to the average intensity of the second branched light. That is, the PD 116 detects the intensity of the light that is exit from the LD bank 110.

The electrical signal that is outputted from the PD 116 is amplified by the amplifier 117 and then compared with a reference voltage Vref by the comparator 118. When the electrical signal is smaller than or equal to the reference voltage Vref, the comparator 118 outputs a signal to the switch 119 and controls the on/off of switch 119.

When receiving a signal from the comparator 118, the switch 119 is turned off to disconnect the LPF 126 from the differential amplifier 127. During the period when no signals are received by the comparator 118, the switch 119 is turned on to connect the LPF 126 with the differential amplifier 127.

Next, functions and advantageous effects of the fifteenth embodiment will be described.

The optical add/drop apparatus having the above configuration can keep the operating point stable even if the input light does not exist during the period when the wavelength of light exit from the LD bank 110 is changed in the optical addition circuit 107a, for example, during the period when laser light of wavelength L2 is switched to laser light of wavelength L4.

This will be explained below in the case where the wavelength L2 is switched to the wavelength L4.

At first, since a wavelength-division multiplexed signal transmitting through the optical transmission line has an available wavelength L2, the LD bank 110 exits light of the wavelength L2. The exit light is modulated by the MZ modulator 113, added in the OADM 102 as an addition light via the N×1 optical multi/demultiplexer 106, and inputted to the optical transmission line. The exit light is also entered to the operating point control circuit, where it is used to control the operating point of the MZ modulator 113. The exit light is also photoelectrically converted by the PD 116, and an output signal of the PD 116 is judged as to whether it is smaller than or equal to the reference voltage Vref by the comparator 118. That is, whether the intensity of the light of the wavelength L2 exit from the LD bank 110 is a predetermined value or less can be judged by the comparator 118 as to whether the electrical signal that is outputted from the PD 116 is smaller than or equal to the predetermined reference voltage Vref.

Since the light of the wavelength L2 exit from the LD bank 110 is used as addition light, its light intensity is larger than the predetermined value and hence the comparator 118 does not output any signals. Therefore, the switch 119 is kept on and LPF 126 is kept connected with differential amplifier 127. As a result, the operating point control circuit continues to operate normally.

Then, the available wavelength of a wavelength-division multiplexed signal transmitting through the optical transmission line is changed from L2 to L4, whereupon the LD bank 110 stops exiting the light of the wavelength L2.

At this time, the level of the output signal of the PD 116 decreases to approximately zero. Since the output signal is smaller than the reference voltage Vref, the comparator 118 sends a signal to the switch 119. The switch 119 is turned off and the LPF 126 is disconnected from the differential amplifier 127. As a result, the operating point control circuit stops operating, and the operating point is put back to the initial state and kept in a range where it can be controlled by the operating point control circuit. Therefore, the operating point is never left in an unstable state.

Then, the LD bank 110 exits light of the wavelength L4. At this time, the output signal of the PD 116 increases to approximately the same level as in the case of the wavelength L2. Therefore, the output signal of the PD 116 becomes larger than the reference voltage Vref and hence the comparator 118 does not send any signals. The switch 119 is turned on and the LPF 126 is connected to the differential amplifier 127. At this time, the operating point control circuit controls the operating point starting from the initial state and hence can operate normally.

While the above description is directed to the case where the LD bank 110 stops the light to exit temporally to change the wavelength of exit light, the operating point can be kept stable in a similar manner also in a case where the light exiting is stopped to use another optical addition circuit 107a in the optical add/drop apparatus.

Next, the sixteenth embodiment will be described.

At first, the sixteenth embodiment will be described starting from its configuration.

Figure 16:
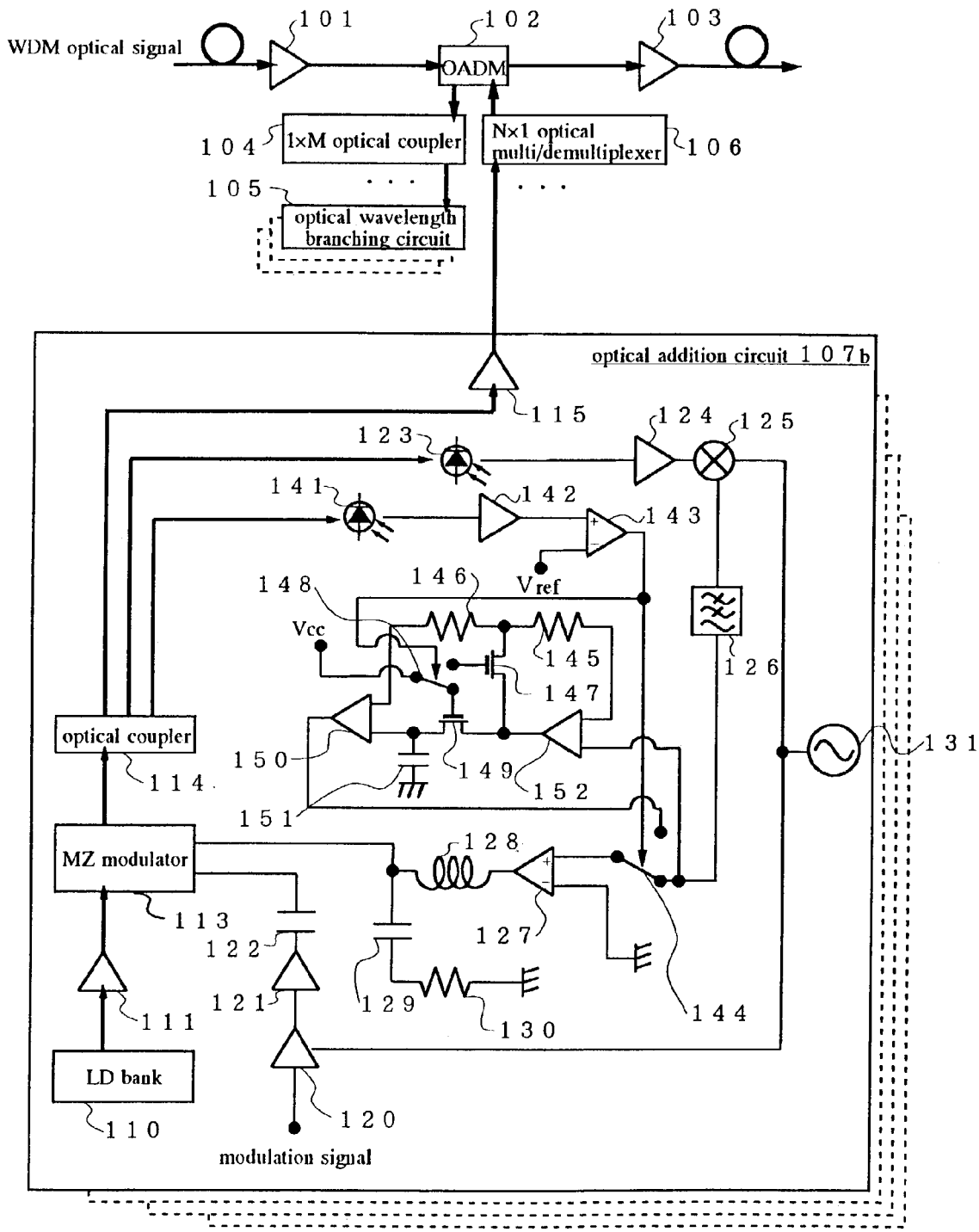
FIG. 16 is a block diagram of the optical add/drop apparatus according to the sixteenth embodiment.

As shown in FIG. 16, this optical add/drop apparatus is composed of optical amplifiers 101 and 103, an OADM 102, an 1×M optical coupler 104, M optical wavelength branching circuits 105, an N×1 optical multi/demultiplexer 106, and N optical addition circuits 107b.

Although this optical add/drop apparatus has the M optical wavelength branching circuits 105 and the N optical addition circuits 107b, in FIG. 16 only one of the M optical wavelength branching circuits 105 and only one of the N optical addition circuits 107b are shown by solid lines and the other circuits are shown with broken lines because the circuits of each group have the same configuration.

A wavelength-division multiplexed optical signal transmitting through an optical transmission line enters the optical add/drop apparatus and is entered to the OADM 102 via the optical amplifier 101. Signal light beams of predetermined wavelengths that have been dropped by the OADM 102 are distributed by the 1×M optical coupler 104 and then entered to the optical wavelength branching circuits 105, where they are received. On the other hand, WDM optical signals to be added in the OADM 102 are generated by the optical addition circuits 107b, which are provided in N, that is, the number of WDM optical signals to be added in the OADM 102. The optical signals to be added and an optical signal that has not been dropped in the OADM 102 are wavelength-division multiplexed with each other, and a resulting WDM optical signal is outputted to the optical transmission line via the optical amplifier 103.

Each optical addition circuit 107b is composed of an LD bank 110, optical amplifiers 111 and 115, an optical coupler 140, an MZ modulator 113, PDS 123 and 141, a buffer amplifier 124, amplifiers 121 and 142, a comparator 143, switches 144 and 148, a variable gain amplifier 120, a coupling capacitor 122, a multiplier 125, an LPF 126, a differential amplifier 127, an inductor 128, capacitors 129 and 151, resistors 130, 145, and 146, a low-frequency oscillator 131, field-effect transistors (hereinafter abbreviated as "FETs") 147 and 149, and operational amplifiers 150 and 152.

In FIG. 16, laser light exit from the LD bank 110 is entered to the MZ modulator 113 via the optical amplifier 111.

A modulation signal and a low-frequency signal of a predetermined frequency f0 that is outputted from the low-frequency oscillator 131 are inputted to the variable gain amplifier 120. An output signal of the variable gain amplifier 120 is inputted to one modulation-input terminal of the MZ modulator 113 via the amplifier 121 and the coupling capacitor 122.

As for the other modulation-input terminal of the MZ modulator 113, to which the resistor 130 and a bias T circuit that is composed of the inductor 128 and the capacitor 129 are connected.

The MZ modulator 113 modulates the light of the LD bank, for example, a wavelength of L2, with the signal supplied from the drive circuit, into an optical signal, and outputs it.

The output light of the MZ modulator 113 is branched into three beams by the optical coupler 140. First branched output light is entered to the PD 123. Second branched output light is entered to the PD 141. Third branched output light is entered to the above-mentioned N×1 optical multi/demultiplexer 106 via the optical amplifier 115. The first branched output light is detected by the PD 123, and a detection signal is inputted to the multiplier 125 via the buffer amplifier 124. The low-frequency signal that is outputted from the low-frequency oscillator 131 is also inputted to the multiplier 125. The multiplier 125 compares the phases of the input signal supplied from the buffer amplifier 124 and the low-frequency signal supplied from the low-frequency oscillator 131, and outputs a signal in accordance with a phase difference.

The output signal of the multiplier 125 is inputted to the LPF 126. An output of the LPF 126 is inputted to one input terminal of the differential amplifier 127 via the switch 144 as well as to the non-inverting input terminal (+) of the operational amplifier 152. The other input terminal of the differential amplifier 127 is grounded. An output of the differential amplifier 127 is inputted to the inductor 128 of the bias T circuit, and the bias value is variably controlled so as to correct the operating point.

An output of the operational amplifier 152 is inputted to the drain terminal of the FET 147 and the source terminal of the FET 149.

The gate terminal of the FET 147, which is controlled by the switch 148, is connected to a voltage source Vcc via the switch 148. The source terminal of the FET 147 is connected to the inverting input terminal (−) of the operational amplifier 152 via the resistor 145 as well as to the inverting input terminal (−) of the operational amplifier 150 via the resistor 146.

The gate terminal of the FET 149, which is controlled by the switch 148, is connected to the voltage source Vcc via the switch 148. The drain terminal of the FET 149 is grounded via the capacitor 151 and connected to the non-inverting terminal (+) of the operational amplifier 150.

A circuit composed of the operational amplifiers 150 and 152, the FETs 147 and 149, the resistors 145 and 146, and the capacitor 151 is a holding circuit for holding the output voltage of the LPF 126.

On the other hand, the second branched output light is detected by the PD 141, which outputs an electrical signal that is in proportion to the average intensity of the second branched output light. That is, the PD 141 detects the intensity of the light that is exit from the LD bank 110 by monitoring the output light of the MZ modulator 113.

The electrical signal that is outputted from the PD 141 is amplified by the amplifier 142 and then compared with a reference voltage Vref by the comparator 143. When the electrical signal is smaller than or equal to the reference voltage Vref, the comparator 143 outputs a signal to the switches 144 and 148 and thereby controls these switches.

The switch 144 can switch connecting the LPF 126 to the differential amplifier 127 and connecting the output terminal of the operational amplifier 150 to the differential amplifier 127. Usually, the switch 144 connects the LPF 126 to the differential amplifier 127, but upon reception of a signal from the comparator 143, the switch 144 switches to connecting the output terminal of the operational amplifier 150 to the differential amplifier 127. When it no longer receives the signal coming from the comparator 143, the switch 144 again connects the LPF 126 to the differential amplifier 127.

The switch 148 controls the on/off of the FETs 147 and 149 in accordance with a signal supplied from the comparator 143. That is, while a signal from the comparator 143 is not received, the switch 148 connects the voltage source Vcc to the gate terminal of the FET 149, thereby keeping the FET 149 on and keeping the FET 147 off. On the other hand, upon reception of a signal from the comparator 143, the switch 148 turns off the FET 149 and connects the voltage source Vcc to the gate terminal of the FET 147, thereby turning on the FET 147.

Next, functions and advantageous effects of the sixteenth embodiment will be described.

The optical add/drop apparatus having the above configuration can keep the operating point of the MZ modulator 113 stable even if the input light no longer exists during a period when the wavelength of light exit from the LD bank 110 is changed in the optical addition circuit 107b, for example, during a period laser light of a wavelength L2 is changed to laser light of a wavelength L4.

This will be explained below in the case when the wavelength L2 is changed to the wavelength L4.

At first, since a wavelength-division multiplexed signal transmitting through the optical transmission line has an available wavelength L2, the LD bank 110 exits light of the wavelength L2. The exit light is modulated by the MZ modulator 113, added by the OADM 102 as addition light via the N×1 optical multi/demultiplexer 106, and outputted to the optical transmission line. The exit light is also entered, via the optical modulator 113 etc., to the operating point control circuit, where it is used to control the operating point of the MZ modulator 113. The exit light is photoelectrically converted by the PD 141 via the MZ modulator 113 etc. An output signal of the PD 141 is judged by the comparator 143 as to whether it is smaller than or equal to the reference voltage Vref. That is, whether the intensity of the light of the wavelength L2 exit from the LD bank 110 is a predetermined value or less can be judged by the comparator 143 as to whether the electrical signal that is outputted from the PD 141 is smaller than or equal to the predetermined reference voltage Vref.

Since the light of the wavelength L2 exit from the LD bank 110 is used as addition light, its light intensity is larger than the predetermined value and hence the comparator 143 does not output any signals. Therefore, the switch 144 keeps connecting the LPF 126 to the differential amplifier 127. As a result, the operating point control circuit continues to operate normally. Further, the switch 148 turns the FETs 147 and 149 on and off, respectively. As a result, the output voltage of the LPF 126 is stored in the capacitor 151.

Then, the available wavelength of a wavelength-division multiplexed signal transmitting through the optical transmission line is changed from L2 to L4, whereupon the LD bank 110 stops exiting the light of the wavelength L2.

At this time, the level of the output signal of the PD 141 decreases to approximately zero. Since the output signal is smaller than the reference voltage Vref, the comparator 143 sends a signal to the switches 144 and 148. The switch 144 switches from connecting the LPF 126 to the differential amplifier 127 to connecting the output terminal of the operational amplifier 150 to the differential amplifier 127. Further, the switch 148 turns the FET 147 on and turns the FET 149 off. Therefore, the output voltage of the LPF 126 which is as same as the voltage stored in the capacitor 151 is outputted to the output terminal of the operational amplifier 150. As a result, the differential amplifier 127 maintains the state just before the LD bank 110 stops exiting the light of the wavelength L2. Therefore, the operating point is never in an unstable state.

Then, the LD bank 110 exits light of the wavelength L4. At this time, the output signal of the PD 141 increases to approximately the same level as in the case of the wavelength L2. Therefore, the output signal of the PD 141 becomes larger than the reference voltage Vref and hence the comparator 143 does not send any signals. The switch 144 switches again from connecting the output terminal of the operational amplifier 150 with the differential amplifier 127 to connecting the LPF 126 with the differential amplifier 127. Therefore, the operating point control circuit controls normally the operating point of the MZ modulator 113 based on the optical signal entered from the optical modulator 113.

In addition, since the operating point control circuit holds the state just before switching the laser light of the wavelength L2 to the laser light of the wavelength L4, the operating point can be compensated for more quickly than in a case where the control of the operating point is started from the initial state.

While the above description is directed to the case where the LD bank 110 temporally stops the light to exit to change the wavelength of exit light, the operating point can be kept stable in a similar manner also in a case where the light exiting is stopped to use another optical addition circuit 107b in the optical add/drop apparatus.

Next, the seventeenth embodiment will be described.

At first the seventeenth embodiment will be described starting from its configuration.

This optical add/drop apparatus is composed of optical amplifiers 101 and 103, an OADM 102, an 1×M optical coupler 104, M optical wavelength branching circuits 105, an N×1 optical multi/demultiplexer 106, and N optical addition circuits 107c.

Figure 17:
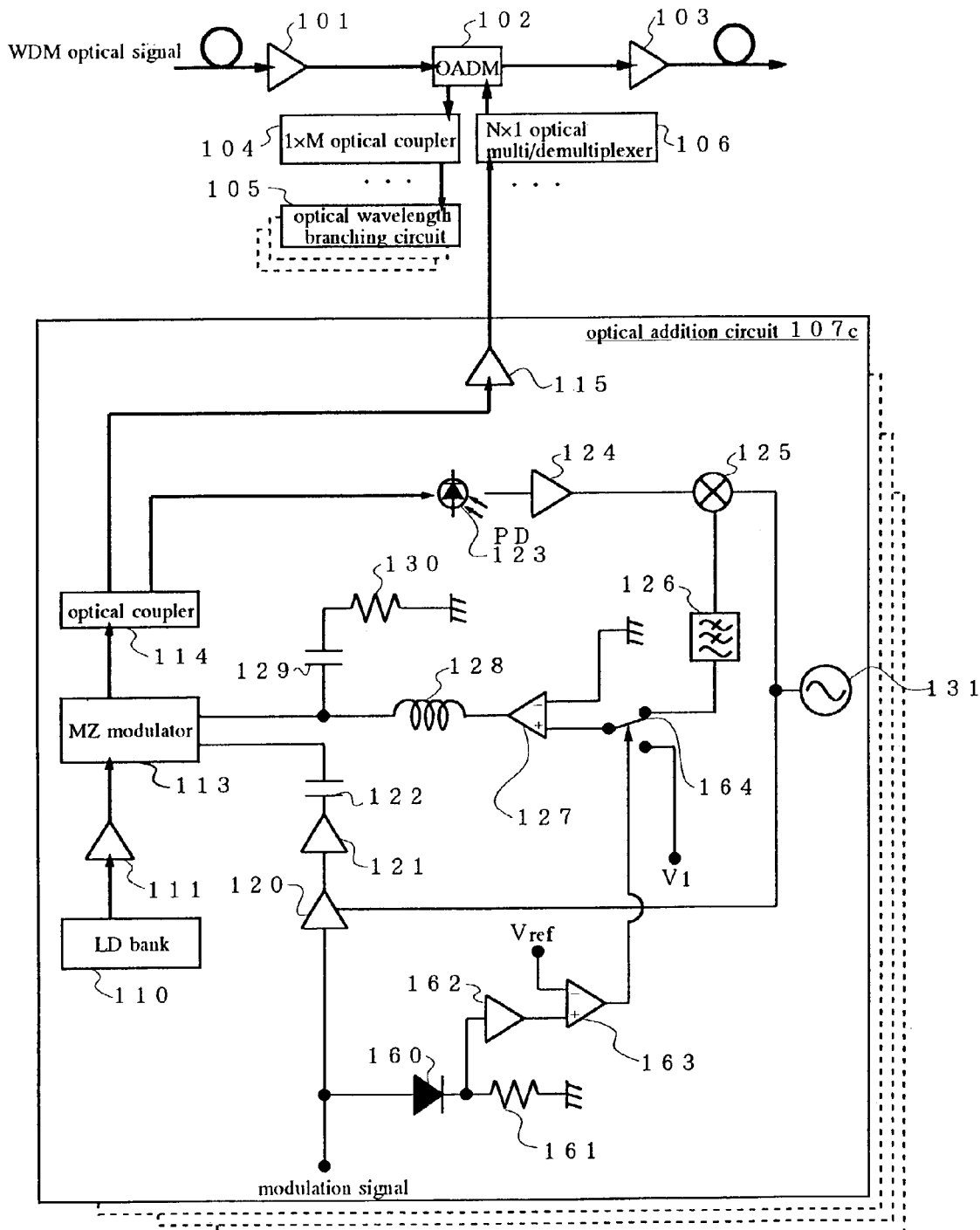
FIG. 17 is a block diagram of the optical add/drop apparatus according to the seventeenth embodiment.

Although this optical add/drop apparatus has the M optical wavelength branching circuits 105 and the N optical addition circuits 107a, in FIG. 17 only one of the M optical wavelength branching circuits 105 and only one of the N optical addition circuits 107c are shown by solid lines and the other circuits are shown with broken lines because the circuits of each group have the same configuration.

A wavelength-division multiplexed optical signal transmitting through an optical transmission line enters the optical add/drop apparatus, and is amplified by the amplifier 101 and then entered to the OADM 102. Signal light beams of predetermined wavelengths that have been dropped by the OADM 102 are entered to the 1×M optical coupler 104. The optical signal(s) distributed by the 1×M optical coupler 104 are entered to the optical wavelength branching circuits 105, where they are subjected to receiving operations. On the other hand, optical signals to be added by the OADM 102 are generated by the optical addition circuits 107c. The optical signals to be added and an optical signal that has not been dropped in the OADM 102 are wavelength-division multiplexed with each other, and is amplified by the optical amplifier 103 and then outputted to the optical transmission line.

Each optical addition circuit 107c is composed of an LD bank 110, optical amplifiers 111 and 115, an optical coupler 114, an MZ modulator 113, a PD 123, a diode 160, amplifiers 121 and 162, a buffer amplifier 124, a comparator 163, a switch 164, a variable gain amplifier 120, a coupling capacitor 122, a multiplier 125, an LPF 126, a differential amplifier 127, an inductor 128, a capacitor 129, resistors 130 and 161, and a low-frequency oscillator 131.

In FIG. 17, laser light exit from the LD bank 110 is entered to the MZ modulator 113 via the optical amplifier 111.

A modulation signal and a low-frequency signal of a predetermined frequency f0 that is outputted from the low-frequency oscillator 131 are inputted to the variable gain amplifier 120. An output signal of the variable gain amplifier 120 is inputted to one modulation-input terminal of the MZ modulator 113 via the amplifier 121 and the coupling capacitor 122.

The resistor 130 and a bias T circuit that is composed of the inductor 128 and the capacitor 129 are connected to the other modulation-input terminal of the MZ modulator 113.

The MZ modulator 113 modulates the light of the wavelength L2 that is exit from the LD bank 110 into an optical signal with the signal supplied from the drive circuit and outputs it.

Part of the output light of the MZ modulator 113 is branched off by the optical coupler 114 and thereby taken out. The other part of the output light is entered to the above-mentioned N×1 optical multi/demultiplexer 106 via the optical amplifier 115. The branched part of the output light is detected by the PD 123, and a detection signal is inputted to the multiplier 125 via the buffer amplifier 124. The low-frequency signal that is outputted from the low-frequency oscillator 131 is also inputted to the multiplier 125. The multiplier 125 compares the phases of the input signal supplied from the buffer amplifier 124 and the low-frequency signal supplied from the low-frequency oscillator 131, and outputs a signal in accordance with a phase difference.

The output signal of the multiplier 125 is inputted to one input terminal of the differential amplifier 127 via the LPF 126 and the switch 164. The other input terminal of the differential amplifier 127 is grounded. An output of the differential amplifier 127 is inputted to the inductor 128 of the bias T circuit, and the bias value is variably controlled so as to correct the operating point.

On the other hand, the modulation signal is connected to one terminal of the diode 160. The other terminal of the diode 160 is grounded via the resistor 161. The modulation signal is half-wave-rectified by the diode 160, whereby a voltage corresponding to the intensity of the modulation signal is detected at both ends of the resistor 161.

The voltage corresponding to the intensity of the modulation signal is amplified by the amplifier 162 and then compared with a reference voltage Vref by the comparator 163. If this voltage is smaller than or equal to the reference voltage Vref, the comparator 163 outputs a signal to the switch 164 and controls it.

The switch 164 can switch between connecting the LPF 126 to the differential amplifier 127 and connecting a reference voltage V1 to the differential amplifier 127. Normally, the switch 164 connects the LPF 126 to the differential amplifier 127. Upon reception of a signal from the comparator 163, the switch 164 switched to connecting the reference voltage V1 to the differential amplifier 127. When the signal coming from the comparator 163 is terminated, the switch 164 again connects the LPF 126 to the differential amplifier 127.

The reference voltage V1 has a value in a range where the operating point can be controlled by the operating point control circuit.

Next, functions and advantageous effects of the seventeenth embodiment will be described.

The optical add/drop apparatus having the above configuration can keep the operating point stable even during a period when there is no modulation signal to be transmitted in the optical addition circuit 107c.

For example, the optical addition circuit 107c operates in the following manner in a case where a modulation signal first exists, then loses its existence, and back in existence again.

At first, a modulation signal to be transmitted modulates input light that is supplied from the LD bank 110 with the MZ modulator 113. Modulated input light as addition light is added as addition light by the OADM 102 supplied via the N×1 optical multi/demultiplexer 106 and outputted to the optical transmission line.

The signal intensity of the modulation light is detected by the diode 160 and the resistor 161, and the comparator 163 judges whether a voltage corresponding to the intensity of the modulation signal is smaller than or equal to the predetermined reference voltage Vref. That is, it is judged whether the intensity of the modulation signal is the predetermined value or less.

At this point, since there exists a modulation signal to be transmitted, the comparator 163 does not send any signals to the switch 164. Therefore, the switch 164 connects the LPF 126 to the differential amplifier 127. The operation point control circuit operates normally, whereby the operating point of the MZ modulator 113 can be controlled by an optical signal entered from the MZ modulator 113.

Then, since the signal to be added does not exist in the optical add/drop apparatus, or an optical addition circuit of the N number of circuits other than the current optical addition circuit 107c is used, the modulation signal will no longer exist.

At this time, the voltage value of the resistor 161 decreases to approximately zero. Since the voltage value is smaller than the reference voltage Vref, the comparator 163 sends a signal to the switch 164. The switch 164 switches from connecting the LPF 126 to the differential amplifier 127 to connecting the reference voltage V1 to the differential amplifier 127. As a result, the operating point control circuit maintains the operating point at the reference voltage V1. Therefore, the operating point is never in an unstable state.

Then, a modulation signal to be transmitted generates again, whereupon a voltage is developed in the resistor 161. As a result, since the voltage value becomes larger than the reference voltage Vref, the comparator 163 does not send any signals. The switch 164 switches connecting the reference voltage V1 to the differential amplifier 127 to connecting the LPF 126 to the differential amplifier 127. Therefore, the operating point control circuit controls normally the operating point of the MZ modulator 113 based on an optical signal entered from the MZ modulator 113, shifting from the state of the reference voltage V1.

In this case, if the reference voltage V1 is selected properly in consideration of the temperature of the MZ modulator 113 in operation and other factors, the operating point can be compensated more quickly than in the case of starting the operating point control from the initial state.

Next, the eighteenth embodiment will be described.

At first, the eighteenth embodiment will be described starting from its configuration.

Figure 18:
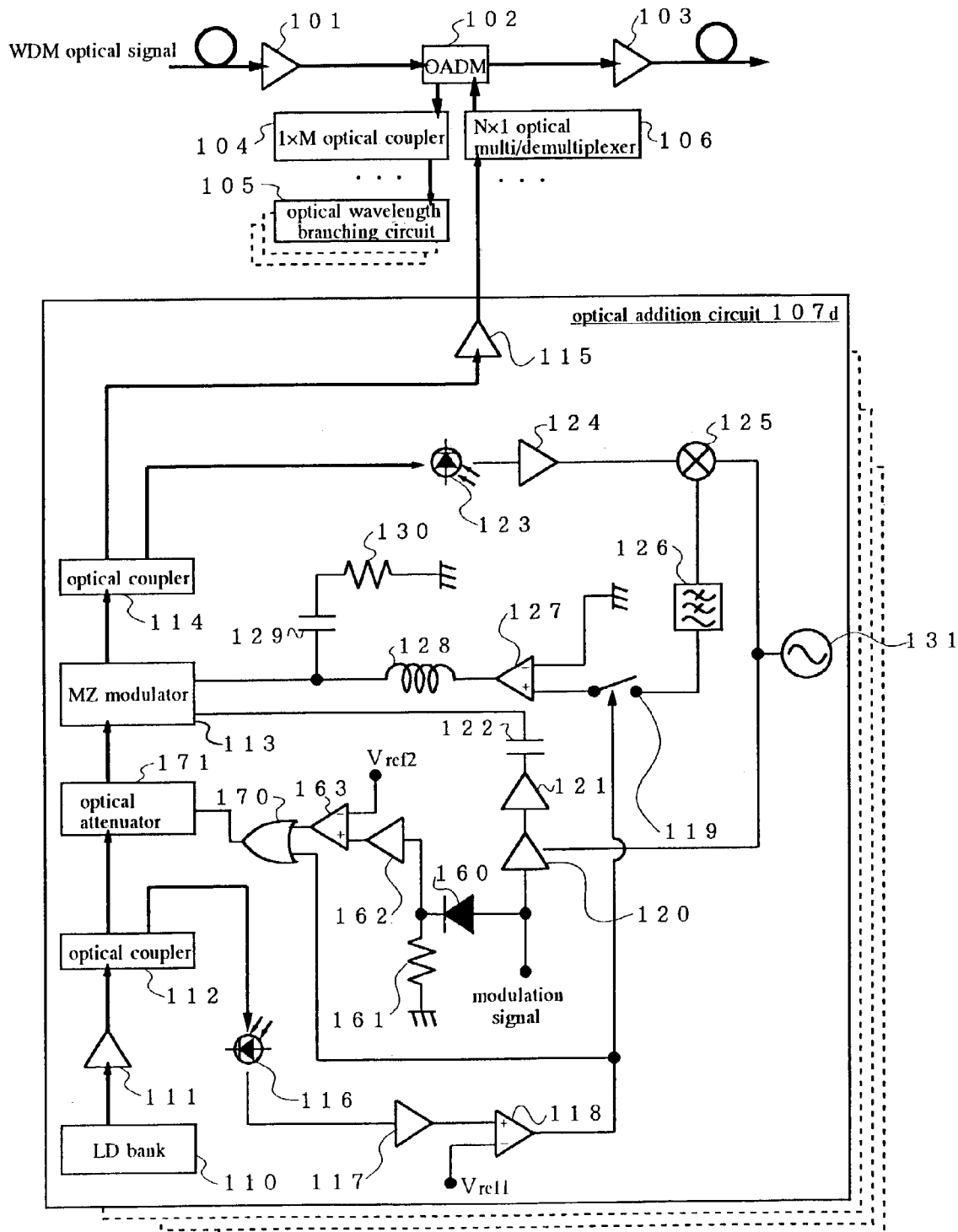
FIG. 18 is a block diagram of the optical add/drop apparatus according to the eighteenth embodiment.

In FIG. 18, this optical add/drop apparatus is composed of optical amplifiers 101 and 103, an OADM 102, an 1×M optical coupler 104, M optical wavelength branching circuits 105, an N×1 optical multi/demultiplexer 106, and N optical addition circuits 107d.

Although this optical add/drop apparatus has the M optical wavelength branching circuits 105 and the N optical addition circuits 107d, in FIG. 18 only one of the M optical wavelength branching circuits 105 and only one of the N optical addition circuits 107d are shown by solid lines and the other circuits are shown with broken lines because the circuits of each group have the same configuration.

A wavelength-division multiplexed optical signal transmitting through an optical transmission line enters the optical add/drop apparatus, is amplified by the amplifier 101, and then entered to the OADM 102. Signal light beams of predetermined wavelengths that have been dropped by the OADM 102 are entered to the 1×M optical coupler 104. The optical signal(s) distributed by the 1×M optical coupler 104 are entered to the optical wavelength branching circuits 105, where they are subjected to receiving operations. On the other hand, optical signals to be added in the OADM 102 are generated by the optical addition circuits 107d. The optical signals to be added and an optical signal that has not been dropped in the OADM 102 are wavelength-division multiplexed with each other, and a resulting optical signal is amplified by the optical amplifier 103 and then outputted to the optical transmission line.

Each optical addition circuit 107d is composed of an LD bank 110, optical amplifiers 111 and 115, optical couplers 112 and 114, an MZ modulator 113, PDS 116 and 123, amplifiers 117, 121, and 162, a buffer amplifier 124, comparators 118 and 163, a switch 119, a variable gain amplifier 120, a coupling capacitor 122, a multiplier 125, an LPF 126, a differential amplifier 127, an inductor 128, a capacitor 129, resistors 130 and 161, a low-frequency oscillator 131, a diode 160, an adder 170, and an optical attenuator 171.

In FIG. 18, laser light exit from the LD bank 110 is entered to the optical amplifier 111. Amplified light is branched into two beams by the optical coupler 112, and first branched light is entered to the MZ modulator 113 via the optical attenuator 171.

On the other hand, second branched light that has been branched off by the optical coupler 112 is entered to the PD 116. An electrical signal that is outputted from the PD 116 is amplified by the amplifier 117 and then compared with a reference voltage Vref1 by the comparator 118. When the electrical signal is smaller than or equal to the reference voltage Vref1, the comparator 118 outputs a signal to the switch 119 and the adder 170.

The switch 119 is controlled in accordance with the output of the comparator 118. When receiving a signal from the comparator 118, the switch 119 is turned off and thereby disconnects the LPF 126 from the differential amplifier 127. During a period when no signal is received from the comparator 118, the switch 119 is kept on and thereby connects the LPF 126 to the differential amplifier 127.

A modulation signal and a low-frequency signal of a predetermined frequency f0 that is outputted from the low-frequency oscillator 131 are inputted to the variable gain amplifier 120. An output signal of the variable gain amplifier 120 is inputted to one modulation-input terminal of the MZ modulator 113 via the amplifier 121 and the coupling capacitor 122.

The resistor 130 and a bias T circuit that is composed of the inductor 128 and the capacitor 129 are connected to the other modulation-input terminal of the MZ modulator 113.

The MZ modulator 113 modulates light that is exited from the LD bank 110, for example, the light of a wavelength L2 into an optical signal, with the signal supplied from the drive circuit, and outputs it.

Part of the output light of the MZ modulator 113 is branched off by the optical coupler 114 and thereby taken out. The other part of the output light is entered to the above-mentioned N×1 optical multi/demultiplexer 106 via the optical amplifier 115. The branched part of the output light is detected by the PD 123, and a detected signal is inputted to the multiplier 125 via the buffer amplifier 124. The low-frequency signal that is outputted from the low-frequency oscillator 131 is also inputted to the multiplier 125. The multiplier 125 compares the phases of the input signal supplied from the buffer amplifier 124 and the low-frequency signal supplied from the low-frequency oscillator 131, and outputs a signal in accordance with a phase difference.

The output signal of the multiplier 125 is inputted to one input terminal of the differential amplifier 127 via the LPF 126 and the switch 119. The other input terminal of the differential amplifier 127 is grounded. An output of the differential amplifier 127 is inputted to the inductor 128 of the bias T circuit, and the bias value is variably controlled so as to correct the operating point of the MZ modulator 113.

On the other hand, the modulation signal is grounded via the diode 160 and the resistor 161. A voltage corresponding to the intensity of the modulation signal is detected at both terminals of the resistor 161.

The voltage corresponding to the intensity of the modulation signal is inputted, via the amplifier 162, to the comparator 163, where it is compared with a reference voltage Vref2. If an electrical signal is smaller than or equal to the reference voltage Vref2, the comparator 163 outputs a signal to the adder 170.

The adder 170 ANDs the signal supplied from the comparator 118 and the signal supplied from the comparator 163 and outputs a result to the optical attenuator 171. That is, the adder 170 outputs a signal to the optical attenuator 171 when receiving (a) signal(s) from either or both comparators 118 and 163, and only when no signals are received from either of the comparators 118 and 163 does it not output any signals to the optical attenuator 171.

When receiving an output of the adder 170, the optical attenuator 171 attenuates the intensity of the input light that is supplied from the optical coupler 112 to a predetermined intensity. When receiving no output from the adder 170, the optical attenuator 171 trajects the input light that is supplied from the optical coupler 112 and outputs it to the MZ modulator 113.

Next, functions and advantageous effects of the eighteenth embodiment will be described.

The optical add/drop apparatus having the above configuration can keep the operating point stable even if the input light loses its existence during a period when the wavelength of light exit from the LD bank 110 is changed in the optical addition circuit 107d, for example, during a period when laser light of a wavelength L2 is changed to laser light of a wavelength L4. Further, neither ASE nor input light that is not modulated with a modulation signal is sent to the N×1 optical multi/demultiplexer 106 even during a period when the optical addition circuit 107d has no modulation signal to be transmitted or there is no light to be exited from the LD bank 110.

The operation of the operating point control circuit in the fourth embodiment to stabilize the operating point is the same as that in the first embodiment and hence is not described here.

The operation in the fourth embodiment to avoid sending ASE or input light that is not modulated with a modulation signal to the N×1 optical multi/demultiplexer 106 will be described below.

The intensity of a modulation signal is detected by the diode 160 and the resistor 161. A voltage corresponding to the intensity of the modulation signal is judged by the comparator 163 as to whether the voltage is smaller than or equal to the predetermined reference voltage Vref2, that is, whether the intensity of the modulation signal is the predetermined value or less.

When there exists a modulation signal to be transmitted, the comparator 163 does not send any signals to the adder 170. Therefore, the adder 170 does not output any signals to the optical attenuator 171, and hence the MZ modulator 113 modulates the light received with the modulation signal and outputs resulting light.

On the other hand, when the modulation signal no longer exists, the voltage value of the resistor 161 decreases to approximately zero. Since the voltage value becomes smaller than or equal to the reference voltage Vref2, the comparator 163 sends a signal to the adder 170. Therefore, the adder 170 outputs a signal to the optical attenuator 171, which attenuates the input light to the predetermined light intensity (including zero). Therefore, neither ASE nor input that is not modulated with a modulation signal is sent to the N×1 optical multi/demultiplexer 106.

The input light exit from the LD bank 110 is photoelectrically converted by the PD 116. The comparator 118 judges whether an output signal of the PD 116 is smaller than or equal to the reference voltage Vref1. That is, whether or not input light is being exit from the LD bank 110 can be judged by the comparator 118 as to whether the electrical signal that is outputted from the PD 116 is smaller than or equal to the predetermined reference voltage Vref1.

When the LD bank 110 is exiting input light, the light intensity is larger than the predetermined value and hence the comparator 118 does not send any signals to the adder 170. Therefore, the adder 170 does not output any signals to the optical attenuator 171, and hence the MZ modulator 113 modulates the light received with a modulation signal and outputs it.

On the other hand, when the LD bank 110 stops exiting input light, the output signal of the PD 116 decreases to approximately zero. Since the output signal becomes smaller than or equal to the reference voltage Vref1, the comparator 118 sends a signal to the adder 170. Therefore, the adder 170 outputs a signal to the optical attenuator 171, which attenuates ASE that is generated in the optical amplifier 111 etc. to the predetermined light intensity (including zero). Therefore, ASE is not sent to the N×1 optical multi/demultiplexer 106.

Naturally, when neither a modulation signal nor input light exists, the adder 170 outputs a signal to the optical attenuator 171 and hence ASE is not sent to the N×1 optical multi/demultiplexer 106.

Next, the nineteenth embodiment will be described.

At first, the nineteenth embodiment will be described starting from its configuration.

Figure 19:
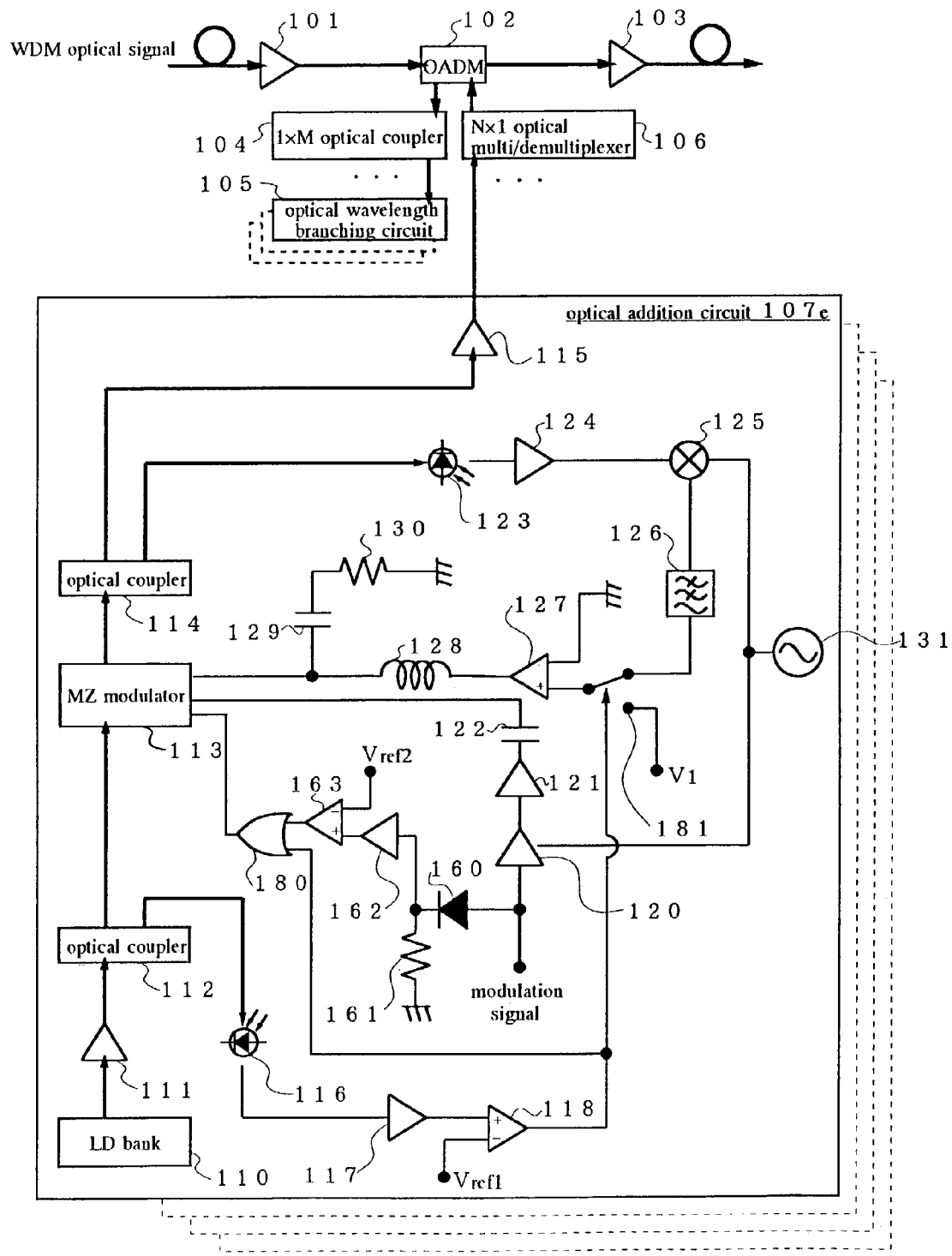
FIG. 19 is a block diagram of the optical add/drop apparatus according to the nineteenth embodiment.
Figure 20:
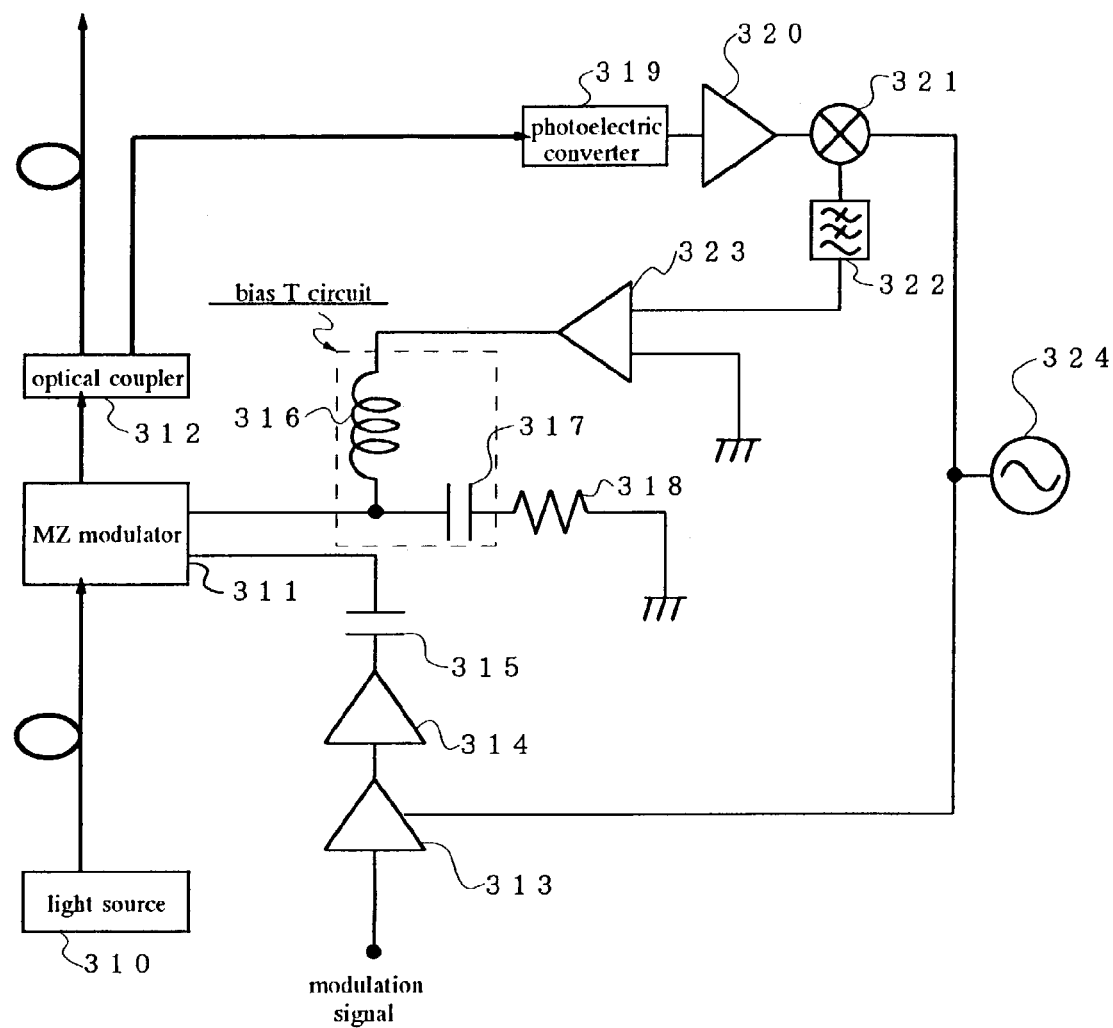
FIG. 20 is a block diagram of an MZ modulator having a conventional operating point control circuit.
Figure 21:
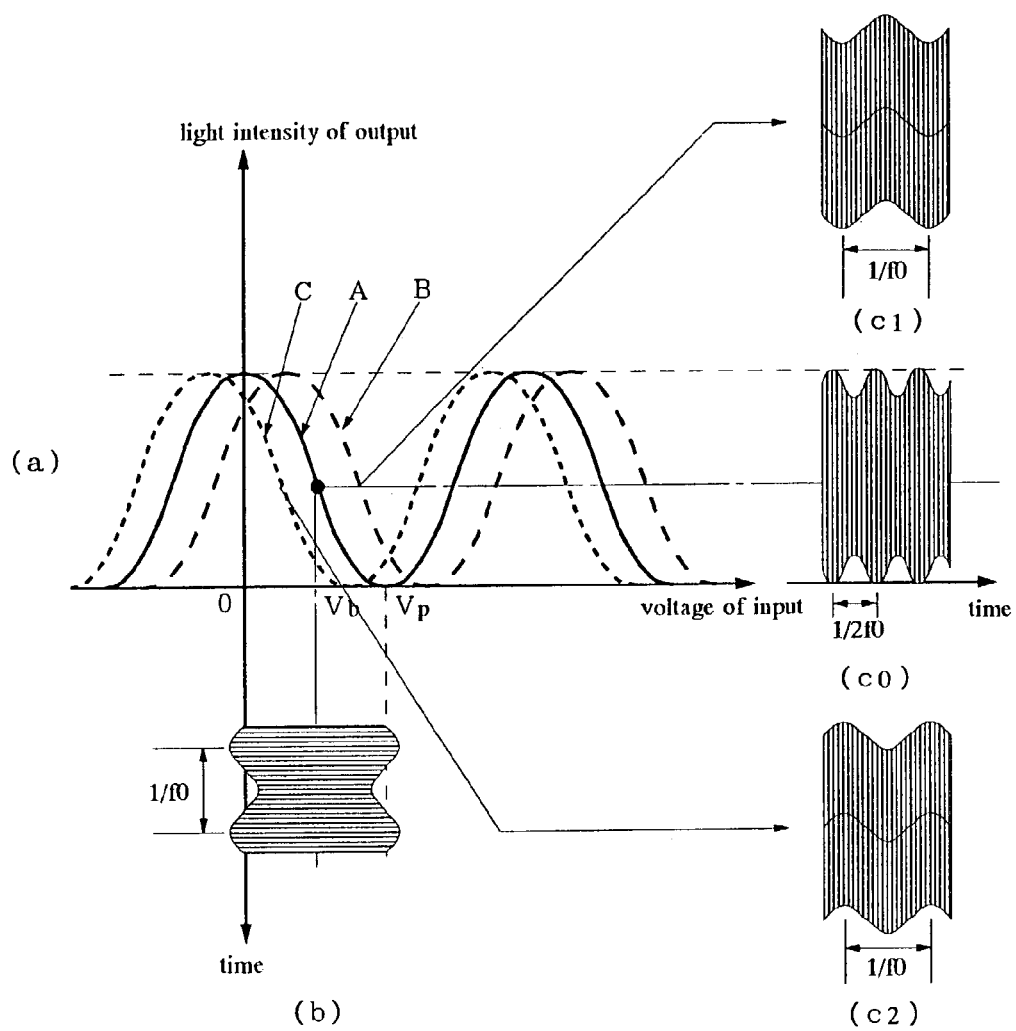
FIG. 21 is a waveform diagram showing an operation in a state that the operating point drifts.
Figure 22:
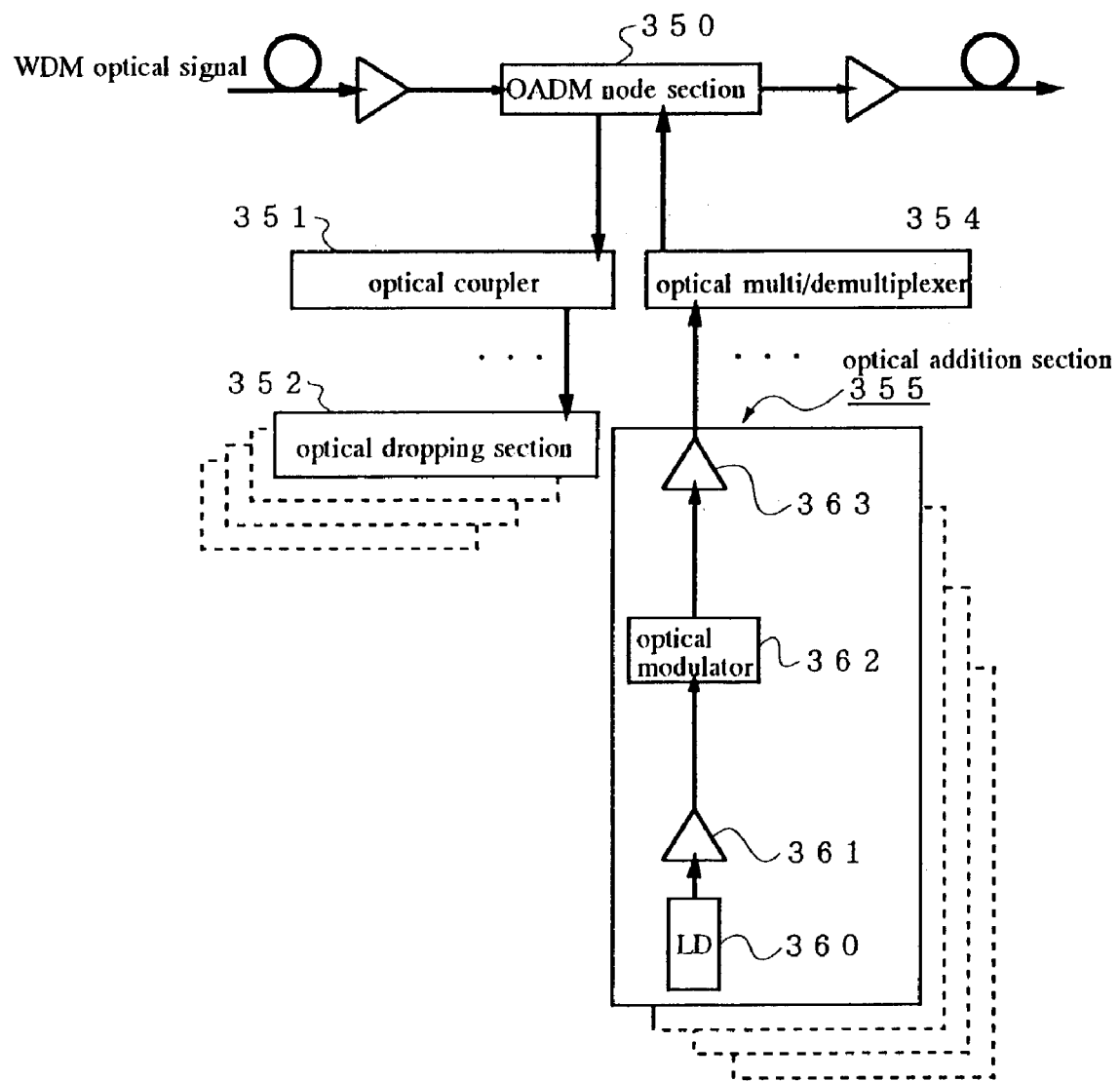
FIG. 22 is a block diagram of a conventional optical add/drop apparatus.

In FIG. 19, this optical add/drop apparatus is composed of optical amplifiers 101 and 103, an OADM 102, an 1×M optical coupler 104, M optical wavelength branching circuits 105, an N×1 optical multi/demultiplexer 106, and N optical addition circuits 107e.

Although this optical add/drop apparatus has the M optical wavelength branching circuits 105 and the N optical addition circuits 107e, in FIG. 19 only one of the M optical wavelength branching circuits 105 and only one of the N optical addition circuits 107e are shown by solid lines and the other circuits are shown with broken lines because the circuits of each group have the same configuration.

A wavelength-division multiplexed optical signal transmitting an optical transmission line enters the optical add/drop apparatus, and is amplified by the amplifier 101 and then entered to the OADM 102. Signal light beams of predetermined wavelengths that have been dropped by the OADM 102 are entered to the 1×M optical coupler 104. The optical signals distributed by the 1×M optical coupler 104 are entered to the optical wavelength branching circuits 105, where they are subjected to receiving operations. On the other hand, optical signals to be added in the OADM 102 are generated by the optical addition circuits 107e. The optical signals to be added and an optical signal that has not been dropped in the OADM 102 are wavelength-division multiplexed with each other, and a resulting optical signal is amplified by the optical amplifier 103 and then outputted to the optical transmission line.

Each optical addition circuit 107e is composed of an LD bank 110, optical amplifiers 111 and 115, optical couplers 112 and 114, an MZ modulator 113, PDs 116 and 123, amplifiers 117, 121, and 162, a buffer amplifier 124, comparators 118 and 163, a switch 181, a variable gain amplifier 120, a coupling capacitor 122, a multiplier 125, an LPF 126, a differential amplifier 127, an inductor 128, a capacitor 129, resistors 130 and 161, a low-frequency oscillator 131, a diode 160, and an adder 180.

In FIG. 19, laser light exit from the LD bank 110 is entered to the optical amplifier 111. Amplified light is branched into two beams by the optical coupler 112, and first branched light is entered to the MZ modulator 113.

On the other hand, second branched light that has been branched off by the optical coupler 112 is entered to the PD 116. An electrical signal that is outputted from the PD 116 is amplified by the amplifier 117 and then compared with a reference voltage Vref1 by the comparator 118. When the electrical signal is smaller than or equal to the reference voltage Vref1, the comparator 118 outputs a signal to the switch 181 and the adder 180.

The switch 181 can switch between connecting the LPF 126 to the differential amplifier 127 and connecting a reference voltage V1 to the differential amplifier 127. Normally, the switch 181 connects the LPF 126 to the differential amplifier 127. Upon reception of a signal from the comparator 118, the switch 181 switches to connecting the reference voltage V1 to the differential amplifier 127. When the signal coming from the comparator 118 is terminated, the switch 181 again connects the LPF 126 to the differential amplifier 127.

The reference voltage V1 has a voltage value in a range where the operating point can be controlled by the operating point control circuit.

A modulation signal and a low-frequency signal of a predetermined frequency f0 that is outputted from the low-frequency oscillator 131 are inputted to the variable gain amplifier 120. An output signal of the variable gain amplifier 120 is inputted to one modulation-input terminal of the MZ modulator 113 via the amplifier 121 and the coupling capacitor 122.

The resistor 130 and a bias T circuit that is composed of the inductor 128 and the capacitor 129 are connected to the other modulation-input terminal of the MZ modulator 113.

The MZ modulator 113 modulates the light of a wavelength L2, for example, that is exit from the LD bank 110 with the signal supplied from the drive circuit, into an optical signal, and outputs it. Further, when receiving a signal from the adder 180, the MZ modulator 113 is prevented from producing output light by shifting the phases of light beams transmitting through two respective optical waveguides in the MZ modulator 113 to form a phase difference of 180°.

Part of the output light of the MZ modulator 113 is branched off by the optical coupler 114 and thereby taken out. The other part of the output light is entered to the abovementioned N×1 optical multi/demultiplexer 106 via the optical amplifier 115. A part of the branched output light is detected by the PD 123, and the detected signal is inputted to the multiplier 125 via the buffer amplifier 124. The low-frequency signal that is outputted from the low-frequency oscillator 131 is also inputted to the multiplier 125. The multiplier 125 compares the phases of the input signal supplied from the buffer amplifier 124 and the low-frequency signal supplied from the low-frequency oscillator 131, and outputs a signal in accordance with a phase difference.

The output signal of the multiplier 125 is inputted to one input terminal of the differential amplifier 127 via the LPF 126 and the switch 181. The other input terminal of the differential amplifier 127 is grounded. An output of the differential amplifier 127 is inputted to the inductor 128 of the bias T circuit, and the bias value is variably controlled so as to correct the operating point of the MZ modulator 113.

On the other hand, the modulation signal is grounded via the diode 160 and the resistor 161. A voltage corresponding to the intensity of the modulation signal is detected at both ends of the resistor 161.

The voltage corresponding to the intensity of the modulation signal is inputted, via the amplifier 162, to the comparator 163, where it is compared with a reference voltage Vref2. If this voltage is smaller than or equal to the reference voltage Vref2, the comparator 163 outputs a signal to the adder 180.

The adder 180 ANDs the outputs of the comparators 118 and 163 and outputs a result to the MZ modulator 113.

Next, functions and advantageous effects of the nineteenth embodiment will be described.

The optical add/drop apparatus having the above configuration can keep the operating point stable even if the input light loses its existence during a period when the wavelength of light exit from the LD bank 110 is changed in the optical addition circuit 107e, for example, during a period when laser light of a wavelength L2 is changed to laser light of a wavelength L4. Further, neither ASE nor input light that is not modulated with a modulation signal is outputted to the N×1 optical multi/demultiplexer 106 even during a period when the optical addition circuit 107e has no modulation signal to be transmitted or there is no light to be exited from the LD bank 110.

The operation of the operating point control circuit in the fifth embodiment to stabilize the operating point is the same as that in the first embodiment except that, in place of the switch 119 being turned on or off, the switch 164 connects one input terminal of the differential amplifier 127 to the LPF 126 or the terminal of the reference voltage V1, and hence it is not described here.

The operation in the fifth embodiment to avoid outputting ASE or input light that is not modulated with a modulation signal to the N×1 optical multi/demultiplexer 106 will be described below.

The intensity of a modulation signal is detected by the diode 160 and the resistor 161. A voltage corresponding to the intensity of the modulation signal is judged by the comparator 163 as to whether the voltage is smaller than or equal to the predetermined reference voltage Vref2, that is, whether the intensity of the modulation signal is the predetermined value or less.

When there is a modulation signal to be transmitted, the comparator 163 does not output any signals to the adder 180. Therefore, the adder 180 does not output any signals to the optical modulator 113, and hence the MZ modulator 113 modulates the received light by the modulation signal and outputs it.

On the other hand, when the modulation signal no longer exists, the voltage value of the resistor 161 decreases to approximately zero. Since the voltage value becomes smaller than or equal to the reference voltage Vref2, the comparator 163 outputs a signal to the adder 180. Therefore, the adder 180 outputs a signal to the optical modulator 113, which shifts the phase differences of respective light beams transmitting through two light waveguides in the MZ modulator 113 by 180°, so the producing of output light is stopped. Therefore, neither ASE nor input that is not modulated with a modulation signal is sent to the N×1 optical multi/demultiplexer 106.

The input light exited from the LD bank 110 is photoelectrically converted by the PD 116. The comparator 118 judges whether an output signal of the PD 116 is smaller than or equal to the reference voltage Vref1. That is, whether input light is being exited from the LD bank 110 can be judged by the comparator 118 as to whether the electrical signal that is outputted from the PD 116 is smaller than or equal to the predetermined reference voltage Vref1.

When the LD bank 110 is exiting input light, the light intensity is larger than the predetermined value and hence the comparator 118 does not output any signals to the adder 180. Therefore, the adder 180 does not output any signals to the optical modulator 113, and hence the MZ modulator 113 modulates the input light with a modulation signal and outputs it.

On the other hand, when the LD bank 110 is not exiting light, the output signal of the PD 116 decreases to approximately zero. Since the output signal becomes smaller than or equal to the reference voltage Vref1, the comparator 118 outputs a signal to the adder 180. Therefore, the adder 180 outputs a signal to the optical modulator 113, which attenuates ASE that is generated in the optical amplifier 111 and etc. Therefore, ASE is not outputted to the N×1 optical multi/demultiplexer 106.

Naturally, when neither a modulation signal nor input light exists, the adder 180 outputs a signal to the optical modulator 113 and hence ASE is not outputted to the N×1 optical multi/demultiplexer 106.

The LD bank 110 used in the first to fifth embodiments can be replaced by a tunable wavelength laser capable of exiting light of an arbitrary wavelength.

What is claimed is:

1. An optical communication apparatus comprising:
    a first optical branching unit branching input light entered to an input port into first and second branched input lights;
    an optical modulating unit modulating the first branched input light in accordance with a modulation signal to be transmitted, to thereby output a modulated optical signal;
    an optical detecting unit detecting a light intensity of the second branched input light;
    a second optical branching unit branching the modulated optical signal output from said optical modulating unit into first and second branched optical signals, and outputting the first branched optical signal to an output port;
    an operating point controlling unit controlling said optical modulating unit in accordance with the second branched optical signal; and
    a controlling unit stopping an operation of said operating point controlling unit when the detected light intensity is equal to or lower than a predetermined value, and controlling an operation of said operating point controlling unit when the detected light intensity becomes higher than the predetermined value from a value equal to or lower than the predetermined value.

2. An optical communication apparatus according to claim 1, further comprising:
    a modulation signal detecting unit detecting a signal intensity of said modulation signal;
    an optical attenuating unit, connected either between said first optical branching unit and said optical modulating unit or between said optical modulating unit and said second optical branching unit, transmitting or attenuating input light; and
    an attenuating amount controlling unit controlling said optical attenuating unit in accordance with said signal intensity detected by said modulation signal detecting unit.

3. An optical communication apparatus according to claim 2, wherein said attenuating amount controlling unit is controlled in accordance with said light intensity detected by said optical detecting unit and said signal intensity detected by said modulation signal detecting unit.

4. An optical communication apparatus comprising:
    an optical modulating unit modulating input light entered to an input port in accordance with a modulation signal to be transmitted, to thereby output a modulated optical signal;
    an optical branching unit branching the modulated optical signal into first, second and third branched optical signals, and outputting the first branched optical signal to an output port;
    an optical detecting unit detecting a light intensity of the second branched optical signal;
    an operating point controlling unit controlling said optical modulating unit in accordance with the third branched optical signal; and
    a controlling unit maintaining an operating point of said operating point controlling unit when the detected light intensity is equal to or lower than a predetermined value, and controlling an operation of said operating point controlling unit from a maintained operating point when the detected light intensity becomes higher than the predetermined value from a value equal to or lower than the determined value.

5. An optical communication apparatus according to claim 4, wherein said controlling unit controls said operating point of said operating point controlling unit to a predetermined value in a control range in accordance with the detected light intensity.

6. An optical communication apparatus according to any one of claims 1 or 2, wherein an optical attenuating unit transmitting or attenuating input light in accordance with an intensity of said input light is inserted into an input or an output of said optical modulating unit.

7. An optical communication apparatus according to any one of claims 1 or 2, wherein said optical modulating unit is controlled in accordance with a signal intensity of said modulation signal or an intensity of input light.

8. An optical communication apparatus according to claim 1 or 4, further comprising:
    a modulation signal detecting unit detecting a signal intensity of said modulation signal; and
    a modulation controlling unit controlling the optical modulating unit in accordance with said signal intensity detected by said modulation signal detecting unit.

9. An optical communication apparatus according to claim 8, wherein said optical modulating unit is controlled in accordance with said light intensity detected by said optical detecting unit and said signal intensity detected by said modulation signal detecting unit.

10. An optical branching/inserting apparatus comprising:
    a branching/inserting unit connected to a transmission path which transmits a wavelength-multiplexed optical signal, said branching/inserting unit capable of branching and inserting an optical signal with at least one wavelength with respect to an optical signal on said transmission path;
    an optical wavelength branching unit processing reception of an optical signal branched by said branching/inserting unit for every wavelength; and
    an optical inserting unit outputting insertion light to be inserted to an optical signal on said transmission path to said branching/inserting unit,
    wherein said optical inserting unit is the optical communication apparatus according to any one of claims 1 or 4.

* * * * *

UNITED STATES PATENT AND TRADEMARK OFFICE
CERTIFICATE OF CORRECTION

| | | |
|---|---|---|
| PATENT NO. | : 7,389,054 B2 | Page 1 of 1 |
| APPLICATION NO. | : 10/464650 | |
| DATED | : June 17, 2008 | |
| INVENTOR(S) | : Hideyuki Miyata et al. | |

It is certified that error appears in the above-identified patent and that said Letters Patent is hereby corrected as shown below:

Column 34, Line 22, change "determined" to --predetermined--.

Column 34, Line 29, change "2," to --4,--.

Column 34, Line 34, change "2," to --4,--.

Signed and Sealed this

Fourteenth Day of October, 2008

JON W. DUDAS
*Director of the United States Patent and Trademark Office*